United States Patent [19]

Lee et al.

[11] Patent Number: 5,663,950
[45] Date of Patent: Sep. 2, 1997

[54] METHODS AND SYSTEMS FOR FAULT ISOLATION AND BYPASS IN A DUAL RING COMMUNICATION SYSTEM

[75] Inventors: Nai Po Lee, Chapel Hill; Jay Lee Smith, Raleigh, both of N.C.

[73] Assignee: International Business Machines Corporation, Armonk, N.Y.

[21] Appl. No.: 429,455

[22] Filed: Apr. 27, 1995

[51] Int. Cl.$^6$ .................. H04J 1/16; H04J 3/14; H04L 12/437

[52] U.S. Cl. .................. 370/224; 370/249; 370/434; 370/502; 395/182.01; 340/825.06

[58] Field of Search .................. 370/13, 13.1, 14, 370/15, 16, 16.1, 85.12, 85.13, 85.14, 85.15, 54, 56, 82, 105.1, 85.2–85.5; 395/181, 182.02, 182.01, 182.03, 185.01; 340/827, 825.05, 825.01, 825.06, 825.16; 379/268, 279

[56] References Cited

U.S. PATENT DOCUMENTS

| | | | |
|---|---|---|---|
| 5,335,227 | 8/1994 | Smith et al. | 370/95.1 |
| 5,351,242 | 9/1994 | Kramarczyk et al. | 370/85.15 |
| 5,353,286 | 10/1994 | Patrick et al. | 370/56 |
| 5,383,191 | 1/1995 | Hobogood et al. | 370/16.1 |
| 5,473,752 | 12/1995 | Beistle et al. | 395/182.02 |
| 5,535,192 | 7/1996 | Truby et al. | 370/16 |

*Primary Examiner*—Alpus H. Hsu
*Assistant Examiner*—Seema S. Rao
*Attorney, Agent, or Firm*—Joscelyn G. Cockburn; Mitchell S. Bigel

[57] ABSTRACT

An apparatus and method for fault isolation and bypass in a dual ring communication system provides a reconfiguration unit capable of attachment to a dual ring communication system having a plurality of reconfiguration units. The disclosed reconfiguration unit has a single adapter to the dual ring communication system and includes isolation and wrap switches capable of isolation and bypass of faults. A reconfiguration unit having a single adapter to the dual ring communication system detects failures on the ring and generates a failure frame which if not received from the ring causes the reconfiguration unit to enter a downstream wrap state. The reconfiguration unit enters an upstream wrap state if a failure frame is received from the nearest downstream reconfiguration unit.

26 Claims, 9 Drawing Sheets

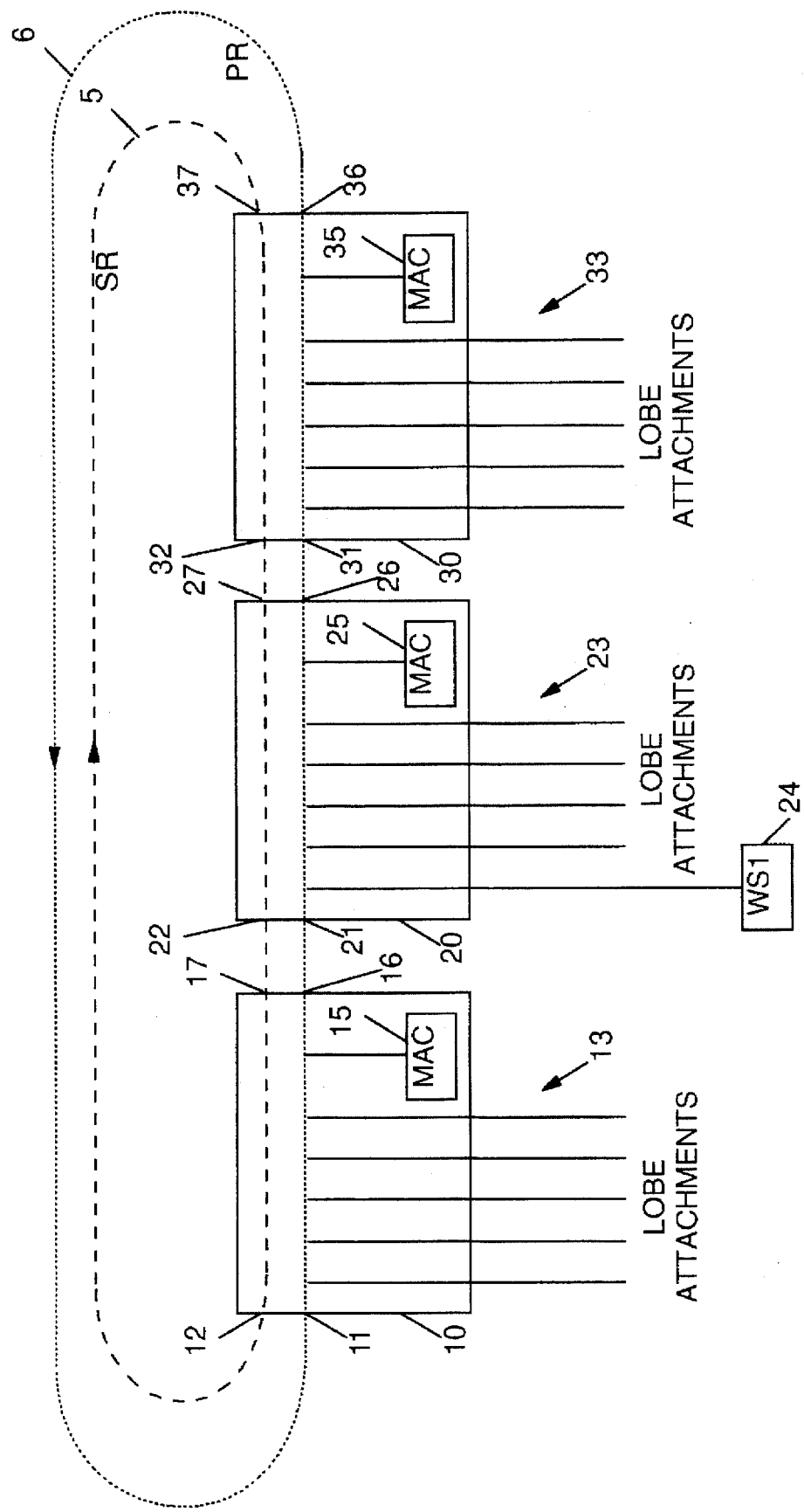

METHODS AND SYSTEMS FOR FAULT ISOLATION AND BYPASS IN A DUAL RING COMMUNICATION SYSTEM

RELATED APPLICATIONS

This application is related to concurrently filed and commonly assigned application entitled METHODS AND SYSTEMS FOR DETERMINING THE NEAREST DOWNSTREAM RECONFIGURATION UNIT IN A DUAL RING COMMUNICATION SYSTEM, Ser. No. 08/429,452 filed Apr. 27, 1995, now pending.

FIELD OF THE INVENTION

The method and apparatus of the present invention relates generally to serial communication networks and more particularly to dual ring communication systems having multiple concentrators or reconfiguration units.

BACKGROUND OF THE INVENTION

Serial communication networks provide many advantages over other well-known networks such as multipoint, star or mesh networks, the most valuable being a fair distributed polling function which readily supports peer-to-peer communications amongst a large number of stations with a high utilization of the network capacity.

One major drawback of the serial network is its propensity to catastrophic failure when any component of the network fails. The drawbacks of a serial network are somewhat reduced by use of a dual ring communication system. A dual ring communication system is comprised of a primary ring or data path and information is passed in a first direction along the primary ring. No information is passed along the secondary ring until a failure occurs. When a failure occurs the secondary ring may be connected to the primary ring to complete the serial communication network. In such a case information is transmitted along the secondary ring in a second direction opposite that of the primary ring.

Over the years many techniques have been developed to detect and/or isolate faults in serial communication networks. One of the more useful techniques, which is in use today in the IEEE 802.5 Token Ring, is disclosed in U.S. Pat. No. 3,564,145. This technique known as beaconing identifies a station, by its address, immediately downstream of a failed network component or station. In a static network (e.g. one in which the network topology is fixed or known) corrective action can be taken to bypass or fix the failed network component.

Another technique (Dual Ring Reconfiguration) has proven very useful in the isolation of faults in a serial network, thereby providing complete or partial network operation following the failure of a network component. This technique employs the dual serial rings described above which may be converted to single ring via switching means to thereby bypass a failed network component. The patents listed below disclose a variety of Dual Ring Reconfiguration implementations:
U.S. Pat. No. 3,519,750
U.S. Pat. No. 3,876,983
U.S. Pat. No. 4,009,469
U.S. Pat. No. 4,354,267
U.S. Pat. No. 4,390,984
U.S. Pat. No. 4,527,270
U.S. Pat. No. 5,538,264
U.S. Pat. No. 4,594,790
U.S. Pat. No. 4,709,365

The patents listed below disclose a variety of manual and automatic techniques for bypassing a failed network component in a single ring serial network:
U.S. Pat. No. 3,458,661
U.S. Pat. No. 4,035,770
U.S. Pat. No. 4,048,446
U.S. Pat. No. 4,245,343
U.S. Pat. No. 4,763,329

While all of the techniques described above are useful either by themselves or in combination, they may have difficulty in providing fast, efficient or complete restoration of communications in a serial ring network following failures of all kinds.

Modern serial networks such as the IEEE 802.5 Token Ring Network generally employ many (up to several hundred or more) ports located throughout an establishment. Many of these ports are not utilized or are connected to inactive stations. In addition, stations (each of which includes a unique identity or address) are frequently moved from one port to another for the convenience of the operator.

In view of the mobility of the stations and the large number of ports which have no or inactive stations connected, the station identity or address accompanying a beacon message provides little information to locate the geographic position of the failed network component.

The technique (Next Active Upstream Neighbor) disclosed in U.S. Pat. No. 4,507,777 is very useful in managing fault recovery in serial networks; however, the sequential station identities or addresses derived from this technique do not provide sufficient network topology information to accurately pinpoint the physical location of the failed component. For example, two adjacent active stations may be separated on the physical network by a number of non-connected or inactive ports. Thus, knowing that station X detected a failure and that station C preceded X does not physically locate a particular faulty component.

U.S. Pat. No. 5,132,962 describes a reconfiguration unit capable of fault isolation and bypass in a dual ring communication system. While this unit fully implements the IEEE 802.5 fault isolation and bypass procedures, it requires three adapters to interface to the primary and secondary rings of the dual ring communication system. These adapters are the single most expensive component of the reconfiguration unit and, therefore, a unit requiring three such adapters may be impractical in certain applications where the high degree of error recovery cannot justify the cost of such reconfiguration units.

Because many existing dual ring networks have been implemented with the technology described above any reconfiguration unit design should be compatible with such networks. Furthermore, to assure compatibility with future designs of reconfiguration units it would be desirable that any reconfiguration unit design or method of fault isolation and bypass be compatible with a network protocol such as the IEEE 802.5 Token Ring standard.

SUMMARY OF THE INVENTION

In view of the limitations described above, it is an object of the present invention to provide a reduced cost reconfiguration unit which is capable of isolating and bypassing faults on a dual ring communication system. Another object of the present invention is to provide a reconfiguration unit for dual ring communication systems capable of operation in a communication system having multiple reconfiguration units. It is a further object of the present invention to provide a reconfiguration unit capable of functioning in existing networks having IEEE 802.5 compatible reconfiguration units such as that described in U.S. Pat. No. 5,132,962.

An additional object of the present invention is to provide a method of fault isolation and bypass which may be implemented using a reconfiguration unit having only a single adapter to the primary ring of a dual ring communication system. Another object of the present invention is to provide a method of fault isolation and bypass which may be implemented in networks having multiple adapter reconfiguration units. Yet another object of the present invention is to provide a method of fault isolation and recovery which is compatible with the IEEE 802.5 Token Ring standard.

In view of the above objectives, one aspect of the present invention provides a reconfiguration unit and method of using a reconfiguration unit capable of connection to a dual ring communication system wherein the reconfiguration unit has a single adapter to the dual ring communication system. The reconfiguration unit also has attachment ports for selectively incorporating devices such as workstations and the like into the dual ring communication system. The reconfiguration unit further has wrap and isolation switches to selectively wrap the primary ring to the secondary ring of the reconfiguration unit to isolate and bypass faults.

In a particular embodiment of the present invention a method for reconfiguring a dual ring communication system to isolate and bypass failed components or connections is provided in which the dual ring communication system has a primary ring (PR) for carrying signals in a first direction and a secondary ring (SR) for carrying signals in a second direction opposite to the first direction wherein the PR and the SR are interconnected by a plurality of reconfiguration units. Each of the reconfiguration units has a PR input, a PR output, a SR input, a SR output, a plurality of attachment ports suitable for receiving signals from data terminals or the like, at least one medium access controller (MAC) for receiving and/or generating signals on the PR and switching units for selectively wrapping the PR and SR. In the particular embodiment of the method of the present invention the reconfiguration units detect a failure on the PR and generate a failure frame on the PR wherein the failure frame contains the address of the first MAC which detected the failure and generated the failure frame. The MAC also determines if a failure frame is received from the PR and connects the first attachment port to the SR input while isolating the SR input from the SR output, isolating the PR input from the first attachment port and connecting the PR input to the SR output if the MAC generating the failure frame has not received the failure frame from the PR within a preselected time. The reconfiguration unit thereby bypasses the failure by wrapping the PR to the SR at the upstream side of the reconfiguration unit and wrapping the attachment ports and MAC to the downstream ring.

The reconfiguration unit detecting the failure may also have switching units for selectively isolating the ring of the reconfiguration unit. In such a case, the reconfiguration method further involves isolating the reconfiguration unit associated with the MAC generating the failure frame from the PR and SR of the dual ring communication network if the MAC generating the failure frame has not received the failure frame from the PR within a preselected time. The reconfiguration unit is isolated by isolating the attachment ports and the MAC from the PR input, the PR output, the SR input and the SR output while maintaining an internal ring between the ports of the reconfiguration unit and the MAC of the reconfiguration unit and while connecting the PR input to the SR output and the PR output to the SR input.

Thus, a ring internal to the reconfiguration unit is formed and the external rings are wrapped to prevent interruption of the other reconfiguration units in the network.

The method also includes testing the isolated reconfiguration unit to determine if the failure was caused by the isolated reconfiguration unit and reconnecting the isolated reconfiguration unit to the PR and SR when the testing determines that the isolated reconfiguration unit did not cause the failure. The isolated reconfiguration unit is reconnected to the PR and SR by disconnecting the PR output from the SR input and connecting the first attachment port to the SR input and the MAC output to the PR output while maintaining the connection between the PR input and SR output and the isolation from the PR input and SR output.

The method of the present invention may also include waiting a preselected time after determining the downstream reconfiguration unit did not cause the failure and then reevaluating the PR and SR connection between the upstream reconfiguration unit and the downstream reconfiguration unit by reconnecting the input of the first attachment port of the downstream reconfiguration unit to the PR input, the output of the MAC to the PR output and the SR input to the SR output while disconnecting the SR output from the PR input and monitoring the PR to determine if a failure continues to occur. If the failure continues to occur the failure is bypassed by disconnecting the downstream reconfiguration unit PR and SR from the PR input and SR output of the downstream reconfiguration unit, connecting the PR input to the SR output and connecting PR to SR prior to the first port of the downstream reconfiguration unit.

In an IEEE 802.5 compatible embodiment of the present invention a failure is detected by detecting an IEEE 802.5 Type 2, Type 3 or Type 4 beacon frame or detecting an absence of transmissions on the PR. Also, the failure frame generated may be an IEEE 802.5 Type 1 beacon frame generated on the PR and containing the address of the MAC generating the frame as the source address field of the beacon frame.

One embodiment of the present invention provides a method for reconfiguring a concentrator which detects a failure on a ring of a dual ring communication system. The method includes detecting a failure on the PR and generating a failure frame on the PR wherein the failure frame contains the address of the MAC of the concentrator detecting the failure. The concentrator then determines if a failure frame is received on the PR with the address of the MAC of the concentrator. If the frame is not received within a preselected time the concentrator bypasses the failure by connecting the first attachment port to the SR input of the concentrator while isolating the SR output from the SR input and the PR input from the first attachment port and connecting the SR output to the PR input.

The method of reconfiguring a concentrator detecting a failure may also include isolating the concentrator generating the failure frame from the PR and SR of the dual ring communication network if the MAC generating the failure frame has not received the failure frame from the PR within a preselected time. The isolation is accomplished, by isolating the attachment ports and the MAC from the PR input and output and the SR input and output while maintaining an internal ring between the ports of the concentrator and the MAC of the concentrator and while connecting the PR input to the SR output and the PR output to the SR input. The concentrator may then test the isolated concentrator to determine if the failure was caused by the isolated concentrator. If the failure was not caused by the isolated concentrator the isolated concentrator is reconnected to the PR and SR by disconnecting the PR output from the SR input and connecting the first attachment port to the SR input and the MAC output to the PR output while maintaining the connection between the PR input and SR output and the isolation from the PR input and SR output.

An additional aspect of the present invention includes a method for reconfiguring a concentrator situated upstream of the concentrator detecting a failure. The method includes receiving a failure frame on the PR and wrapping the PR to the SR at the PR output and SR input when the failure frame contains a source address corresponding to the MAC of the nearest downstream concentrator while connecting the MAC output to the SR output and isolating the MAC output from the PR output and isolating the SR output from the SR input. The method also includes repeating the failure frame on the PR when the source address of the failure frame is not the address of the nearest downstream concentrator.

The concentrator may also have a switching unit for selectively isolating the MAC of the concentrator from the PR and the SR and wrapping the input of the MAC to the output of the MAC. The method then further includes isolating from the PR and the SR the MAC of the concentrator when a failure frame is received which has a source address of the MAC of the nearest downstream concentrator and wrapping the PR and the SR of the concentrator by connecting the PR to the SR after the last port and before the MAC of the concentrator and connecting the PR output to the SR input. The method also tests the isolated MAC to determine if the MAC is the cause of the failure and then reconnects the isolated MAC if the testing determines that the MAC is not the cause of the failure. The isolated MAC is reconnected by reconnecting the MAC to the PR and SR while maintaining the isolation from the PR output and the SR input and relocating the wrap of the PR and SR to after the MAC of the concentrator.

A particular embodiment of the apparatus of the present invention provides a reconfiguration unit for a dual ring communication system having a primary ring input, a primary ring output, a secondary ring input, a secondary ring output and a plurality of attachment ports having a ring in connection and a ring out connection suitable for receiving signals from data terminals and the like. The reconfiguration unit also has a medium access control unit (MAC) having a ring in connection and a ring out connection which is connected downstream of the last active attachment port for receiving, generating and/or repeating signals. The reconfiguration unit further includes port reconfiguration means connected to the primary ring input, the primary ring output, the secondary ring input, the secondary ring output, the MAC and the plurality of attachment ports for selectively connecting the input ports, the output ports, the MAC and the attachment ports to form a dual ring communication system between active attachment ports, the MAC and the inputs and outputs in response to control signals. The reconfiguration unit includes control means connected to the MAC and the port reconfiguration means for providing the control signals to the port reconfiguration means and for receiving and transmitting signals to the MAC. Downstream wrap means responsive to the control means are also included for selectively disconnecting the SR input from the SR output, disconnecting the PR input from the ring in connection of the first active attachment port and for connecting the ring in connection of the first active attachment port to the SR input and connecting the PR input to the SR output.

The reconfiguration unit may also include internal ring connection means responsive to the control means for selectively connecting the ring in and ring out connections of the active attachment ports to the ring in and ring out connections of the MAC to form a ring of the active attachment ports and the MAC internal to the reconfiguration unit. MAC isolation means responsive to the control means may also be included in the reconfiguration unit for selectively isolating the MAC from the attachment ports and the input and output ports and for connecting the ring in connection to the ring out connection of the MAC while connecting the PR output port to the SR input port and connecting the ring out connection of the last active attachment port to the SR output port.

Additional aspects of the present invention include reconfiguration units having reconfiguration unit isolation means responsive to the control means for selectively activating the internal ring connection means and for connecting the PR output to the SR input and the PR input to the SR output. Also included may be upstream wrap means responsive to the control means for connecting the PR output to the SR input and connecting the ring out connection of the MAC to the SR output.

In an additional embodiment of the present invention a dual ring communication system capable of fault isolation and fault bypass is provided. The dual ring communication system has at least two reconfiguration units connected so as to form a ring wherein at least one of said reconfiguration units is a single medium access controller (MAC) reconfiguration unit. A dual ring communication system is also provided wherein each of the reconfiguration units is a single MAC reconfiguration unit.

In view of the above, these aspects of the present invention provide a lower cost reconfiguration unit capable of use in a dual ring communication system having multiple reconfiguration units. Because the reconfiguration units of the present invention utilize only a single adapter to the communication ring, the cost of such systems is reduced. Furthermore, because the reconfiguration units perform the fault isolation and bypass by wrapping the PR to the SR at the inputs or outputs of the unit the integrity of the ring external to the units may be maintained with only minimal disruption.

Also provided is a method of fault isolation and bypass capable of use in multiple reconfiguration unit networks. The present invention also provide a reconfiguration units and methods of fault isolation and bypass which are compatible with both existing hardware and with the IEEE 802.5 standard. The methods and apparatus of the present invention utilize existing commands and frame formats to detect and isolate the faults. Finally, the methods of the present invention provide a method of fault isolation and bypass allow for use with reconfiguration units having only one MAC or adapter to the dual ring communication system thus making possible the advantages of the reconfiguration units of the present invention.

BRIEF DESCRIPTION OF THE DRAWINGS

FIG. 1 is a block diagram of a dual ring communication system comprised of reconfiguration units of the present invention.

DETAILED DESCRIPTION OF THE PREFERRED EMBODIMENTS

Figure 2A:
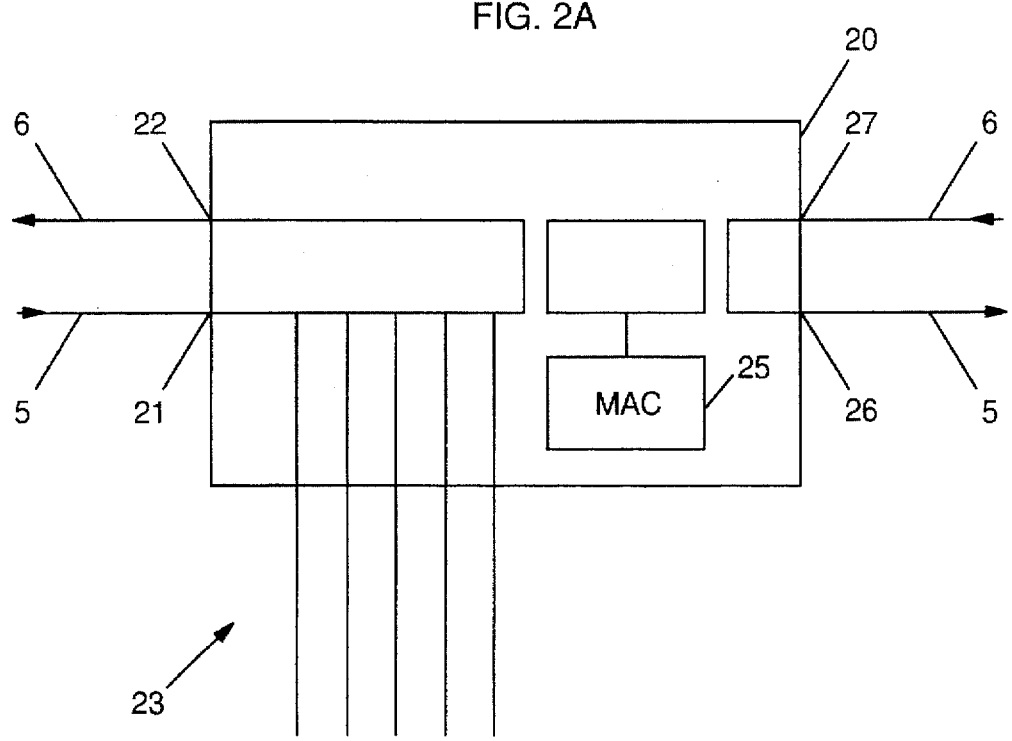
FIG. 2A is a block diagram of a reconfiguration unit according to the present invention in the MAC isolation state.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Described below is one particular embodiment of the present invention as part of an IEEE 802.5 Token Ring Network. As will be appreciated by one of ordinary skill in the art, the principles of the present invention may be applied to other forms of dual ring communication systems.

FIG. 1 illustrates a dual ring communication system having a primary data path 5 or primary ring and a secondary data path 6 or secondary ring. As seen in FIG. 1, data is transmitted in a first direction on the primary data path 5 and in a second, opposite direction on the secondary data path 6. Data is transmitted sequentially along the active data path and passes through each of the attachments interconnected to the data path. Included in the dual ring communication system illustrated in FIG. 1 are reconfiguration units 10, 20, and 30. These reconfiguration units 10, 20, and 30 may be concentrators for providing attachment ports 13, 23, and 33 to the dual ring communication system for interconnection of workstations and the like to the primary or secondary data paths. These workstations are interconnected to form a ring of sequentially connected devices. Thus, each attachment port will have a ring in and a ring out which are selectively connected to other active attachment ports to form the data ring. Methods of such selective attachment are described in commonly assigned U.S. Pat. No. 5,132,962 the disclosure of which is incorporated herein as if set forth fully. For illustrative purposes a workstation 24 capable of receiving, transmitting and/or optionally generating signal on the active data path is shown as attached to reconfiguration unit 20 at attachment ports 23. The devices connected to the attachment ports should at a minimum be capable of propagating the signals received at the ring in of the device to the ring out of the device. While a workstation has been described as attached to the attachment ports, as will be understood by one of skill in this art, other attachments or devices may be interconnected to the dual ring communication system through the attachment ports.

FIG. 1 further illustrates the reconfiguration units 10, 20, and 30 which have inputs 11, 21, and 31 and outputs 16, 26, and 36 which are interconnected to form the primary data path 5. Thus in operation, information is transmitted from a device or workstation connected to reconfiguration unit 20 would be transmitted on the cable connected to primary ring output 26 and received by reconfiguration unit 30 at primary ring input 31. The information would then propagate through reconfiguration unit 30 and be transmitted to the cable connected to primary ring output 36. The information would then be received at primary ring input 11 of reconfiguration unit 10 and propagate through reconfiguration unit 10. Reconfiguration unit 10 would then transmit the information on the cable connected to primary ring output 16 and the information would be received at primary ring input 21 of reconfiguration unit 20.

The reconfiguration units 10, 20, and 30 also have outputs 12, 22, and 32 and inputs 17, 27, and 37 which are interconnected to form the secondary data path 6. The secondary data path typically operates only in the case of a fault. However, the secondary ring output 12 of reconfiguration unit 10 is connected to the secondary ring input 37 of reconfiguration unit 30, the secondary ring output 32 of reconfiguration unit 30 is connected to the secondary ring input 27 of reconfiguration unit 20 and the secondary ring output 22 of reconfiguration unit 20 is connected to the secondary ring input 17 of reconfiguration unit 10.

Finally, illustrated in FIG. 1 is an adapter or medium access control unit (MAC) 15, 25, and 35 which is part of each of the reconfiguration units. The function of MAC 25 is to provide an interface to the primary data path. The MAC in each reconfiguration unit is connected to the primary data path 5 downstream of the attachment ports. As used herein, downstream refers to sequentially following in the direction of data traffic on the active path and upstream refers to sequentially preceding in the direction opposite to data traffic on the active data path. For example, in FIG. 1, reconfiguration unit 20 is downstream of reconfiguration unit 10 and upstream of reconfiguration unit 30 when data is transmitted on the primary data path 5. The MAC may be fully compatible with the IEEE 802.5 Medium Access Control layer or may only implement the error recovery subset of the MAC layer of the IEEE standard. Furthermore, for purposes of the present invention, only those fault detection and recovery functions described below need be implemented in the MAC.

While the above dual ring communication network has been described with respect to three single MAC reconfiguration units, any number of reconfiguration units may be interconnected to form the dual ring communication system. Furthermore, the reconfiguration units of the present invention may be interconnected with other reconfiguration units such as those described in U.S. Pat. No. 5,132,962 having three adapters connected to the various rings of the dual ring communication systems while still maintaining the capabilities and benefits of fault isolation and bypass of the present invention and of the multiple adapter reconfiguration units.

Particular aspects of the methods of the present invention will now be described with reference to FIG. 1 and FIG. 2.

Failures along the ring may be divided into four categories based upon the location of the failure. First, the failure may occur in the interconnection between reconfiguration units. Second, the failure may occur internal to the MAC associated with a particular reconfiguration unit. Third, the failure may occur internal to the reconfiguration unit but external to the MAC of the reconfiguration unit. Finally, the failure may occur within the individual device or the connection between the individual device and the particular attachment port of the reconfiguration unit. Each of these failure locations may be isolated and bypassed utilizing the apparatus and methods of the present invention.

When a failure occurs, the failure is detected either by the nearest attached device or the nearest MAC downstream of the failure. Thus, if the failure occurs between reconfiguration units, within the MAC or within an attachment to a reconfiguration unit, then the failure will be detected by the first MAC of a reconfiguration unit downstream of the failure. For purposes of illustration, the isolation of a failure in the primary ring 5 between reconfiguration unit 10 and reconfiguration unit 20 will be described.

After the error on primary ring 5 occurs, workstation 24 notifies MAC 25 of the failure. When the failure is detected, the MAC 25 generates a failure frame on the primary ring 5 which contains the address of MAC 25 which detected the failure and generated the failure frame. MAC 25 then determines if the failure frame it generated is received from the primary ring 5. If the failure frame is not received from the primary ring 5 within a preselected time, reconfiguration unit 20 enters the downstream wrap state illustrated in FIG. 2D. References to the downstream wrap state refer to the wrap state of the reconfiguration unit having a physical location downstream of the failure location. In the downstream wrap state the first active attachment port of reconfiguration unit 20 is connected to the secondary ring input 27 while the secondary ring input 27 is isolated from the secondary ring output 22. Also in the downstream wrap state, the primary ring input 21 is isolated from the first attachment port and the primary ring input 21 is connected to the secondary ring output 22.

Figure 2B:
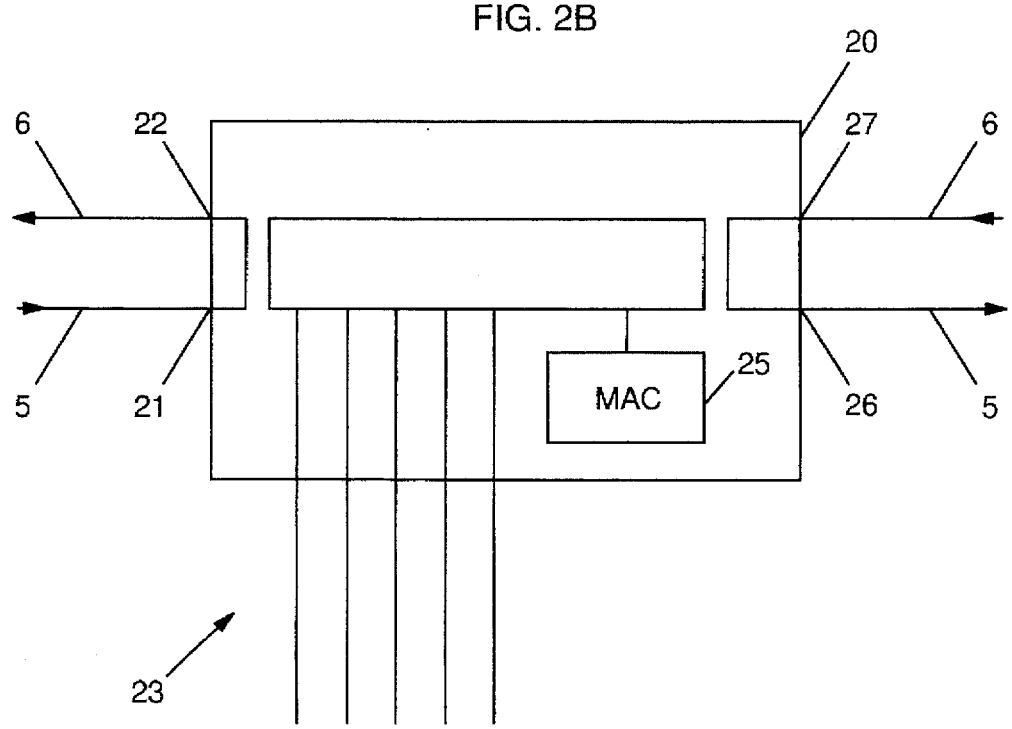
FIG. 2B is a block diagram of a reconfiguration unit according to the present invention in the Internal Isolation state.

Optionally, before entering the downstream wrap state, reconfiguration unit 20 could enter the internal isolation state depicted in FIG. 2B. In the internal isolation state, the reconfiguration unit associated with the MAC generating the failure frame is isolated from the primary and the secondary rings. In the present case, reconfiguration unit 20 is isolated by isolating the attachment ports 23 and the MAC 25 from the primary ring input 21 and output 26 and the secondary ring input 27 and output 22 while maintaining an internal ring between the attachment ports 23 and MAC 2B and while connecting the primary ring input 21 to the secondary ring output 22 and the primary ring output 26 to the secondary ring input 27. Reconfiguration unit 20 then tests the internal ring to determine if the failure was caused internal to reconfiguration unit 20. If it is determined that the error was not internal to reconfiguration unit 20, then reconfiguration unit 20 would enter the downstream wrap state described above and depicted in FIG. 2D. The downstream wrap state is entered from the internal isolation state by disconnecting the primary ring output 26 from the secondary ring input 27 and connecting the first attachment port of reconfiguration unit 20 to the secondary ring input 27 and connecting the output of MAC 25 to the primary ring output 26 while maintaining the connection between the primary ring input 21 and secondary ring output 22 and the isolation from the primary ring input 21 and secondary ring output 22.

Reconfiguration unit 20 may also optionally wait a preselected time after determining that the failure was not internal to reconfiguration unit 20 and then reevaluate the primary ring and secondary ring connections to the upstream reconfiguration unit 10 and the downstream reconfiguration unit 30 by reconnecting the input of the first attachment port of reconfiguration unit 20 to the primary input 21, the output of MAC 25 to the primary output 26 and the secondary ring input 27 to the secondary ring output 22 while disconnecting the secondary ring output 22 from the primary ring input 21. Reconfiguration unit 20 would then monitor the primary ring to determine if a failure continues to occur. If a failure continues to occur, reconfiguration unit 20 would then reenter the downstream wrap state described above.

With regard to the downstream reconfiguration unit 30, when MAC 35 received the failure frame with the address of MAC 25, reconfiguration unit 30 determines that the failure frame did not come from the nearest downstream reconfiguration unit to reconfiguration unit 30 and so repeats the failure frame on the primary ring.

Figure 2C:
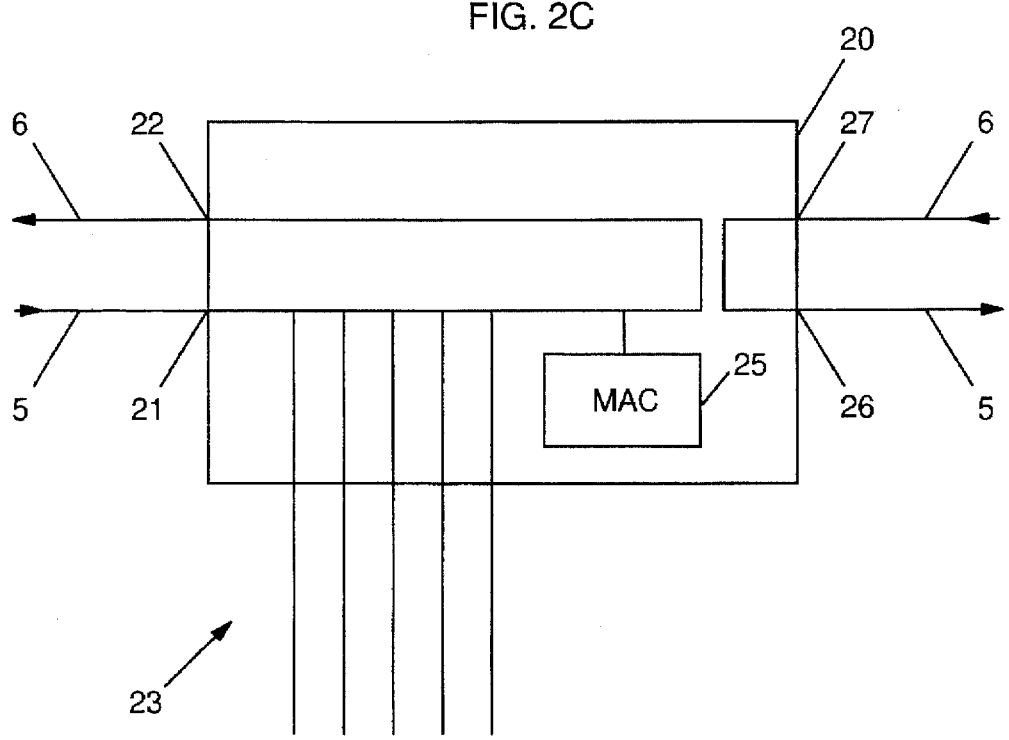
FIG. 2C is a block diagram of a reconfiguration unit according to the present invention in the Upstream Wrap state.
Figure 2D:
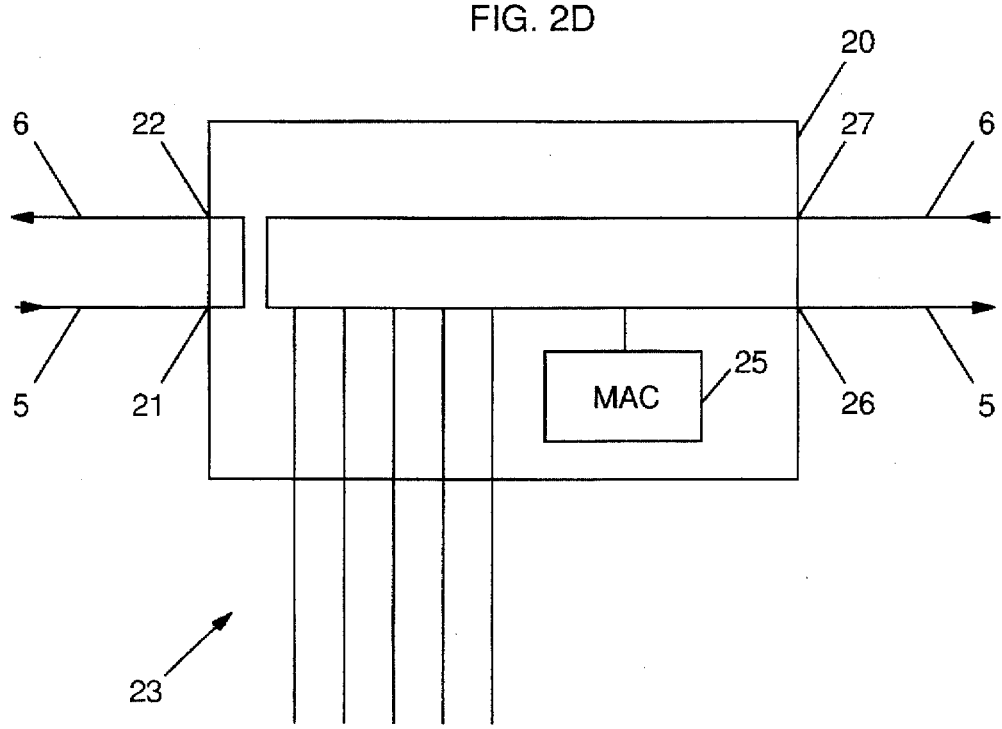
FIG. 2D is a block diagram of a reconfiguration unit according to the present invention in the Downstream Wrap state.

When reconfiguration unit 10 receives the failure frame, it determines that the failure frame was generated by the nearest downstream reconfiguration unit as so reconfiguration unit 10 enters upstream wrap state as depicted in FIG. 2C. References to the upstream wrap state refer to the wrap state entered by the reconfiguration unit having a physical location upstream of the failure location. Reconfiguration unit 10 enters the upstream wrap state by wrapping the primary ring to the secondary ring at the primary ring output 16 and the secondary ring input 17. Reconfiguration unit 10 also wraps the output of MAC 15 to the secondary ring output 12.

Optionally, reconfiguration unit 10 could enter the MAC isolation state depicted in FIG. 2A and then evaluate MAC 15 to determine if MAC 15 caused the failure. To enter the MAC isolation state, reconfiguration unit 10 isolates the primary ring and the secondary ring from MAC 15 and wraps the primary ring and the secondary ring of reconfiguration unit 10 by connecting the primary ring to the secondary ring after the last attachment port and before MAC 15 and connecting the primary output 16 to the secondary input 17. Reconfiguration unit 10 then tests the isolated MAC 15 to determine if MAC 15 caused the failure. Reconfiguration unit 10 then reconnects the isolated MAC 15 if the testing determines that MAC 15 did not the cause the failure. MAC 15 is reconnected by reentering the upstream wrap state described above.

As with the downstream reconfiguration unit 20, the upstream reconfiguration unit 10 may optionally retest the ring to determine if the failure has been repaired. After a preselected time expires and if MAC 15 was not the cause of the failure, reconfiguration unit 10 reevaluates the primary ring and the secondary to ring connection between reconfiguration unit 10 and reconfiguration unit 20 by entering the normal connection state depicted in FIG. 1. The normal connection state is entered by reconnecting the primary ring internal to reconfiguration unit 10 to primary ring output 16 and the secondary ring internal to reconfiguration unit 10 to the secondary ring input 17 and then monitoring the primary ring to determine if a failure continues. If the failure continues to occur, reconfiguration unit 10 reenters the upstream wrap state as described above.

Figure 3:
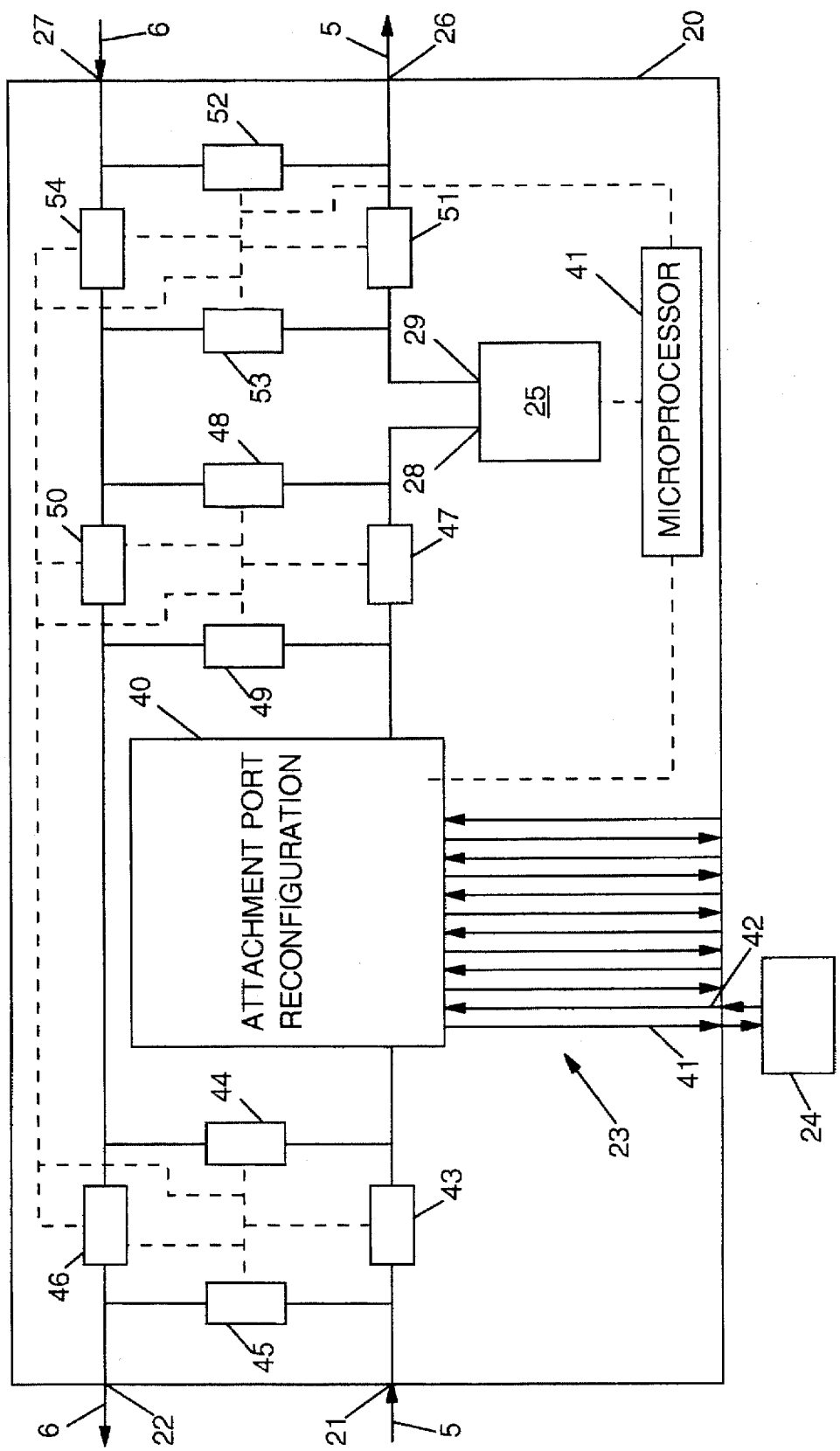
FIG. 3 is a block diagram of one embodiment of a reconfiguration unit according to the present invention.

One particular embodiment of the apparatus of the present invention is shown in FIG. 3. FIG. 3 is a block diagram of a single MAC reconfiguration unit according to the present invention. For purposes of consistency, FIG. 3 has been labeled consistent with reconfiguration unit 20 of FIG. 1 with like elements having the same numeric identification. As seen in FIG. 3, reconfiguration unit 20 is connected to the primary ring 5 through the primary ring input 21 and the primary ring output 26. Reconfiguration unit 20 is connected to the secondary ring 6 through the secondary ring input 27 and the secondary ring output 22. Reconfiguration unit 20 also has a plurality of attachment ports 23 each having a ring out connection 41 and a ring in connection 42 suitable for receiving signals from data terminals and the like. Medium access control unit (MAC) 25 is connected within reconfiguration unit 20 downstream of the last of the plurality of attachment ports 23 and has a ring in connection 28 and a ring out connection 29 which connect MAC 25 to the primary ring. MAC 25 is capable of receiving signals at the ring in connection 28, generating signals at the ring out connection 29, and/or repeating signals received at the ring in connection 28 on the ring out connection 29.

Reconfiguration unit 20 also contains port reconfiguration means 40 connected to the primary ring 5, MAC 25 and the plurality of attachment ports 23. The port reconfiguration means selectively connects the active input ports (i.e. input ports with functional devices attached) to the primary ring so as to form a path for the primary ring through the active devices. The port reconfiguration means may also selectively isolate particular ports which have failing attachments to thereby bypass the failing attachment. One implementation of a port reconfiguration means is described in U.S. Pat. No. 5,132,962 at column 3 line 43 through column 4 line 43, the disclosure of which is incorporated herein by reference. However, in the present invention as only one MAC or adapter is present, the reconfiguration switch of the '962 patent would receive the configuration information from the microprocessor 41 which acts as a control means for the reconfiguration unit 20. Furthermore, as will be appreciated by one of skill in this art, the control means of reconfiguration unit 20 may include a microprocessor, an ASIC, or other programmable devices which may carry out the described functions described below. The control means of reconfiguration unit 20 may also, optionally, be incorporated in MAC 25.

In addition to the above elements for creating and maintaining a ring path through active attachments, the reconfiguration unit 20 also has elements for selectively wrapping and bypassing elements of the reconfiguration unit for fault isolation and fault recovery. On the upstream side of the port reconfiguration means 40 the isolation and bypass elements include isolation switches 43 and 46 and wrap switches 44 and 45. Between the port reconfiguration means 40 and MAC 25 the isolation and bypass elements include isolation switches 47 and 50 and wrap switches 48 and 49. Downstream of MAC 25 the isolation and bypass elements include isolation switches 51 and 54 and wrap switches 52 and 53. As will be appreciated by one of skill in this art, isolation and wrap switches may be relays, transistors or other switching devices which can selectively connect one signal path to a second signal path.

As seen in FIG. 3, isolation switch 43, which is responsive to control signals from microprocessor 41, selectively disconnects the primary ring 5 at the primary ring input 21 from the port reconfiguration means 40 and isolation switch 46, which is also responsive to control signals from microprocessor 41, selectively disconnects the secondary ring 6 at the secondary ring output 22 from the secondary ring input 27. In normal operation isolation switches 43 and 46 are in the closed or connected state where isolation switch 43 connects the primary ring 5 to the port reconfiguration means 40 and isolation switch 46 connects the secondary ring 6 to isolation switch 50.

Reconfiguration unit 20 also includes wrap switch 45 which is responsive to control signals from the microprocessor 41 and which selectively connects the primary ring 5 between the primary ring input 21 and isolation switch 43 to the secondary ring 6 between the secondary ring output 22 and isolation switch 46. Wrap switch 44 is responsive to control signals from the microprocessor 41 and selectively connects the primary ring entering the port reconfiguration means 40 to the secondary ring between isolation switches 46 and 50. In normal operation wrap switches 44 and 45 are in the open or disconnected state such that the primary ring and secondary ring are not connected.

Between the port reconfiguration means 40 and MAC 25 the isolation and bypass elements include isolation switch 47 which is responsive to control signals from microprocessor 41 and selectively disconnects the output of the primary ring of port reconfiguration means 40 from the ring in 28 of MAC 25. Isolation switch 50 is also responsive to control signals from microprocessor 41 and selectively disconnects the secondary ring output 22 from the secondary ring input 27. In normal operation, isolation switches 47 and 50 are in the closed or connecting state. Wrap switch 48 is responsive to microprocessor 41 and selectively connects the primary ring between isolation switch 47 and MAC 25 and the secondary ring between isolation switch 50 and the connection point of wrap switch 53. Wrap switch 49 is responsive to microprocessor 41 and selectively connects the primary output of the port reconfiguration means 40 to the secondary ring path internal to the reconfiguration unit. In normal operation, wrap switches 48 and 49 are in the open or disconnected state.

The final isolation and bypass elements are located downstream of MAC 25 and include isolation switch 51 which is responsive to microprocessor 41 and selectively disconnects the ring out 29 of MAC 25 from the primary ring output 26 of reconfiguration unit 20. Isolation switch 54 is also responsive to microprocessor 41 and disconnects secondary ring input 27 from the secondary ring output 22. In normal operation, isolation switches 51 and 54 are in the closed or connection state. Wrap switch 52 is responsive to microprocessor 41 and selectively connects the ring out 29 of the MAC 25 to the secondary ring between isolation switch 54 and the connection of wrap switch 48 to the secondary ring of reconfiguration unit 20. Wrap switch 53 is responsive to microprocessor 41 and selectively connects the primary ring output 26 between isolation switch 51 and primary ring output 26 to the secondary ring input 27 between the secondary ring input 27 and isolation switch 54. In normal operation wrap switches 52 and 53 are in the open or disconnected state.

Reconfiguration unit 20 has been described with reference to individual switching units 43, 44, 45, 46, 47, 48, 49, 50, 51, 52, 53 and 54. As will be appreciated by one of skill in this art, each grouping of switches may be implemented using a single relay having two normally open contacts and two normally closed contacts. For example, switches 43, 44, 45, and 46 could be implemented using a single relay with normally open contacts for switches 44 and 45 and normally closed contacts for switches 43 and 46. When the relay actuates the normally open contacts close and the normally closed contacts open, thus causing the isolation and wraps desired. While these switches may be implemented using a single relay, as will be appreciated by one of skill in this art, other switching devices may be employed such as transistors or multiple relays.

While reconfiguration unit 20 has been described in detail above, for purposes of the discussion regarding operation of the reconfiguration units, reconfiguration units 10 and 30 should be considered as having corresponding microprocessor, port reconfiguration means, wrap switches and isolation switches. Accordingly, these elements of reconfiguration units 10 and 30 will be referred to herein by the reference numerals of FIG. 3.

In normal operation, signals are transmitted serially along the primary ring 5 from the workstation or MAC generating the signals to the next active device on the primary ring. These devices then generate or repeat the signals along the primary ring based upon the content of the signals. However, when a device or connection fails, the primary ring no longer forms a complete ring and this error is detected by devices along the ring. The isolation and bypass of such a failure will now be described with regard to a particular reconfiguration unit 20 as illustrated in the Figures.

When the failure occurs in the interconnection between the reconfiguration units, for example on the primary ring 5 between reconfiguration unit 10 and reconfiguration unit 29 in FIG. 1, the first active device 24 on reconfiguration unit 20 detects the break in communications around the ring. Such detection may occur simply by the device detecting that no activity occurs along the ring. When such an error is detected, device 24 enters Beacon Transmit mode and transmits a Type 2, Type 3 or Type 4 Beacon frame on the ring depending upon how the error was detected by the device as defined by the IEEE 802.5 standard. The Beacon frame is repeated by each of the active devices attached to reconfiguration unit 20 until the Beacon frame reaches MAC 25. If no active devices are attached to reconfiguration unit 20 MAC 25 may detect the failure. If the error is detected by MAC 25 because no active devices are attached to reconfiguration unit 20, MAC 25 enters Beacon Transmit mode but, as described below, does not transmit the Type 2, Type 3 or Type 4 Beacon frame on the ring. When MAC 25 receives a Beacon frame or detects a failure the operations as described in the flow chart of FIG. 4A, FIG. 4B and FIG. 4C are carried out by MAC 25 and microprocessor 41.

Figure 4A:
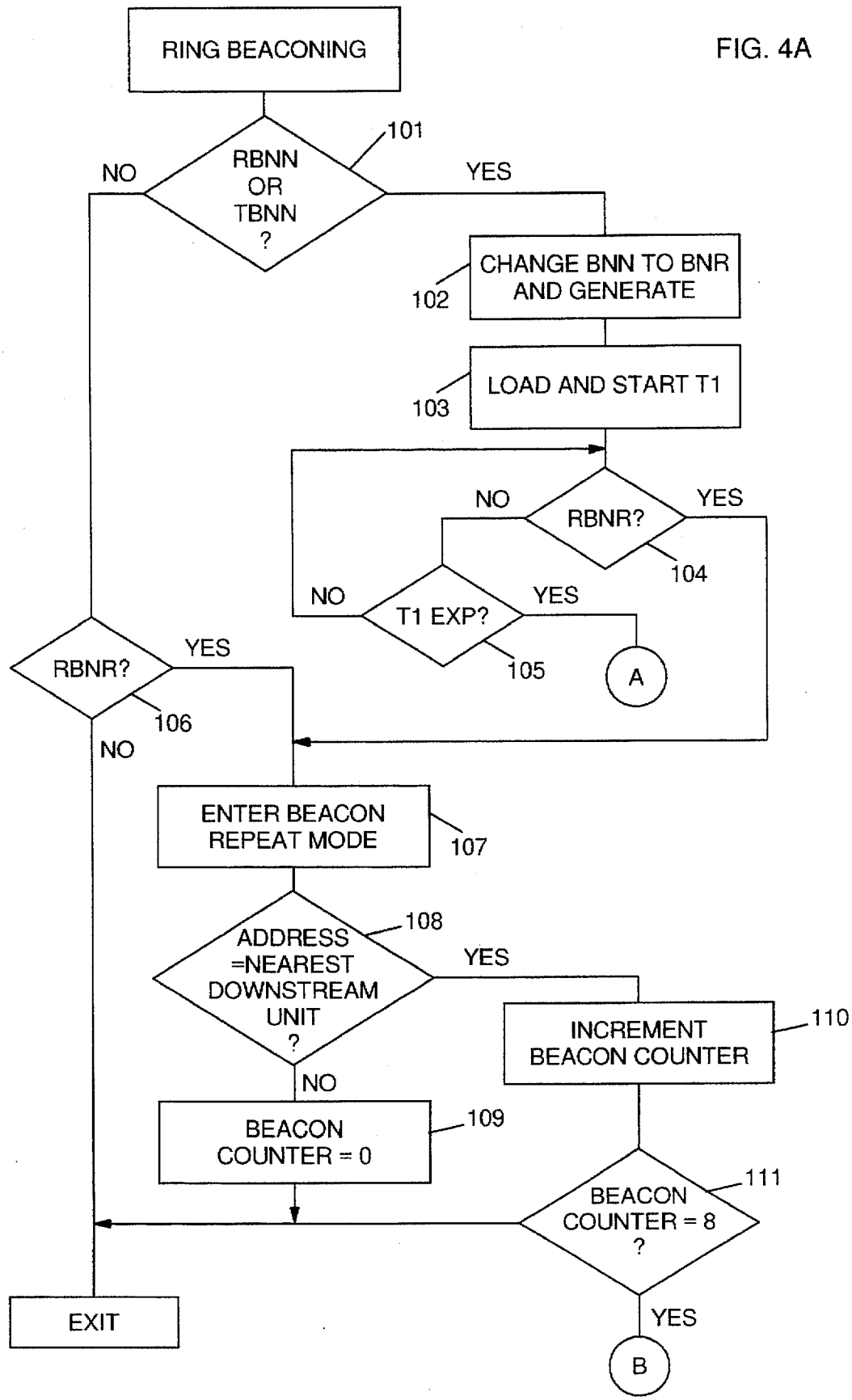
FIG. 4A, FIG. 4B, and FIG. 4C is a flow chart of one embodiment of the operations performed by a reconfiguration unit according to the method of fault isolation and bypass of the present invention.
Figure 4B:
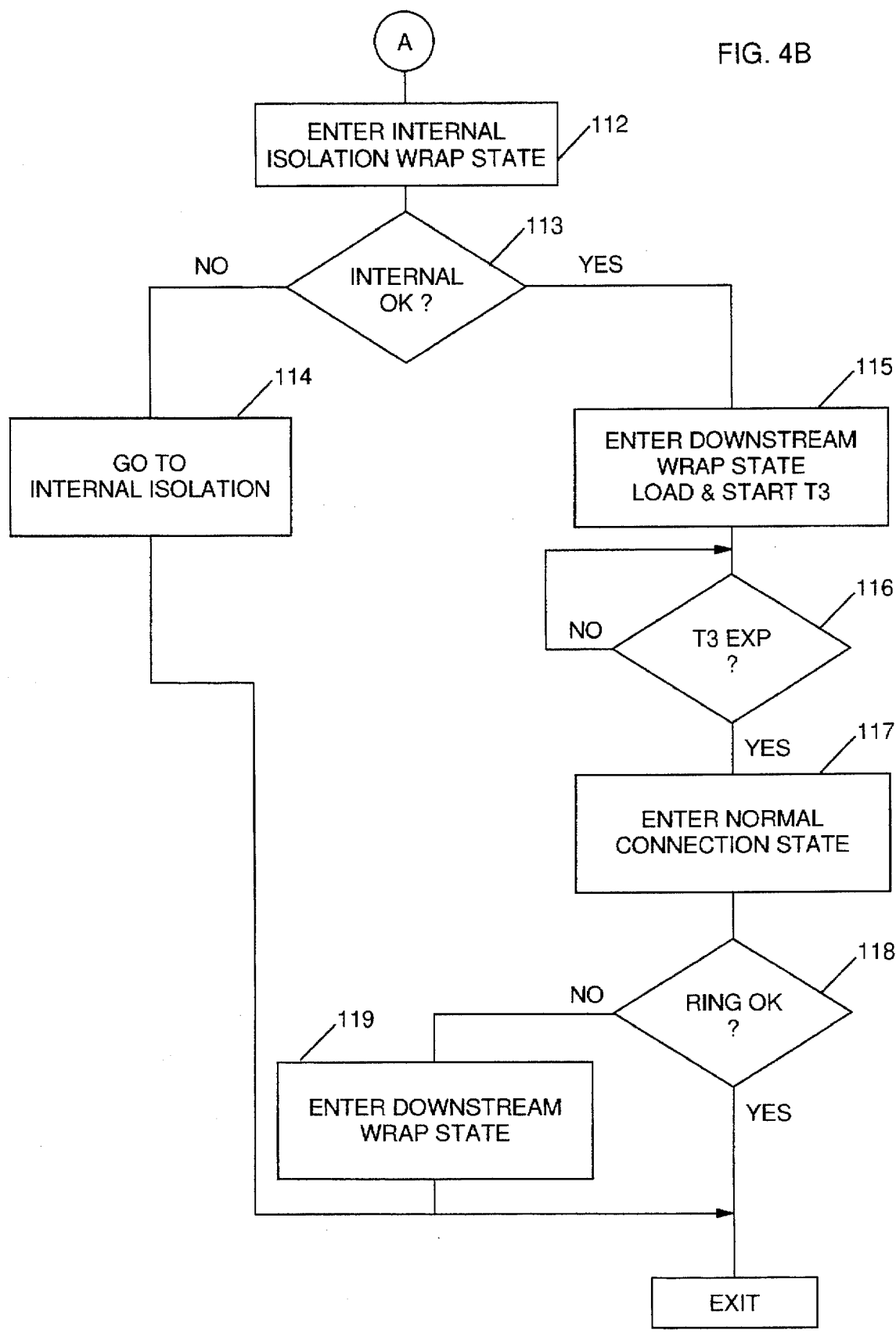
Figure 4C:
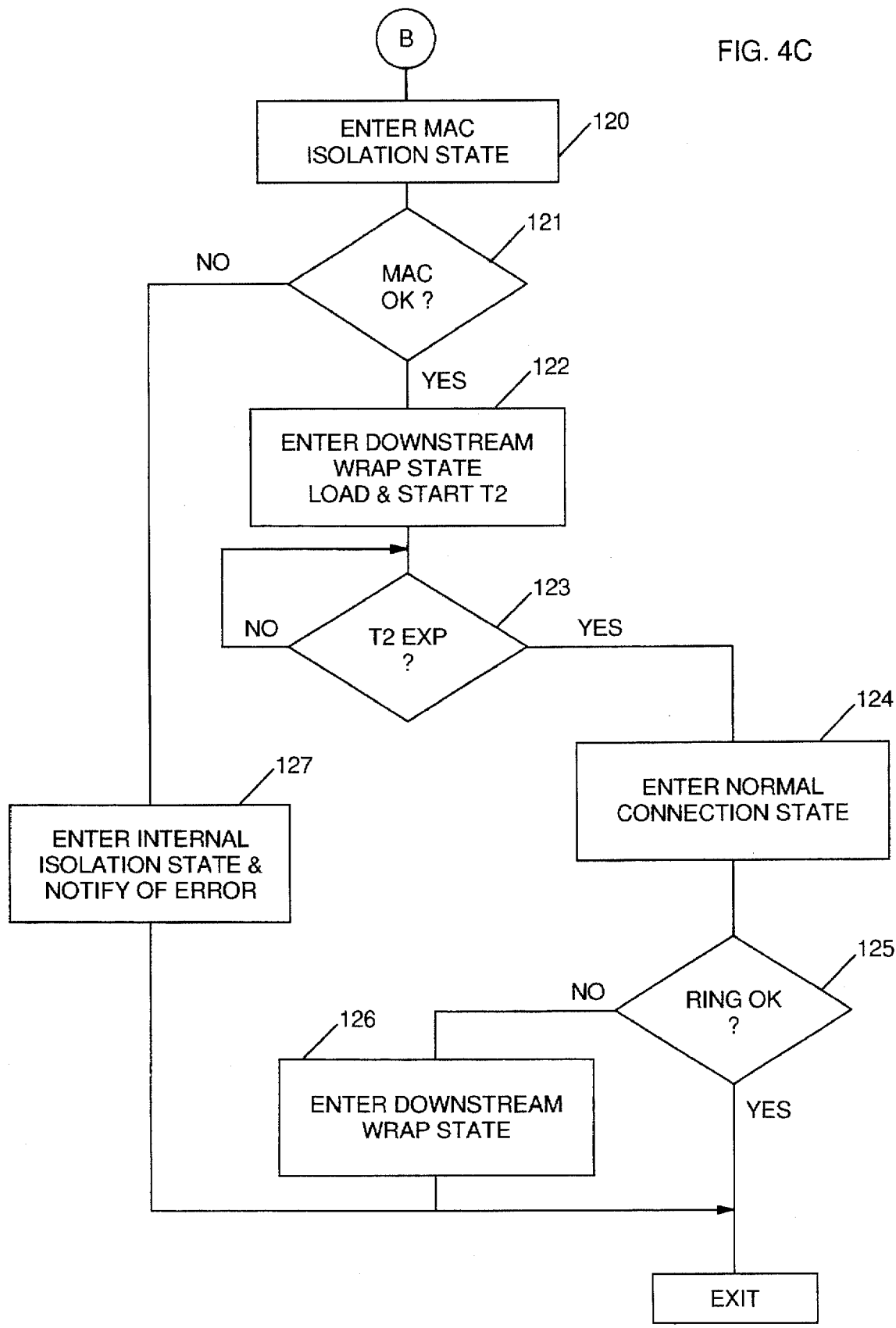

As seen in FIG. 4A at decision block 101, MAC 25 and microprocessor 41 determine if the Beacon frame received is a Type 1 (BNR) or a Type 2, Type 3 or Type 4 (BNN) Beacon frame. Because the error occurred between the MAC 15 of reconfiguration unit 10 and reconfiguration unit 20 the Beacon frame will be a BNN frame which is received by MAC 23. As used herein and in the figures, RBNN will refer to Type 2, Type 3 or Type 4 beacon frames received by a MAC of a reconfiguration unit. TBNN shall be used to refer to Type 2, Type 3 or Type 4 Beacon frames which are to be transmitted by a MAC of a reconfiguration unit. Had the error been detected by MAC 25 then MAC 25 would prepare the appropriate BNN frame as a TBNN frame but would not transmit the frame on the ring. In either case, the "yes" branch will be taken and block 102 will be carried out converting the RBNN or TBNN frame to a Type 1 Beacon frame (BNR) and transmitting the Type 1 Beacon frame on the ring. Block 103 is then carried out and Response Timer (T1) is begun. As illustrated in blocks 104 and 105, the MAC 25 and the microprocessor 41 then wait to see if a BNR frame is received by MAC 25 within the time set for Response Timer (T1). Time of from about 7.0 to about 7.5 seconds are preferred but other times may be used based upon a particular network configuration.

If a BNR frame is received within the time T1, then, the "yes" path of block 104 is taken and reconfiguration unit 20 enters Beacon Repeat Mode. The procedures then carried out by reconfiguration unit 20 are the same as if reconfiguration unit 20 were a reconfiguration unit downstream of the reconfiguration unit generating the BNR frame. Accordingly, these procedures will be described below with respect to reconfiguration units which receive a BNR frame If a BNR frame is not received within the time T1, then, as indicated at block 112, reconfiguration unit 20 enters the internal isolation wrap state shown in FIG. 2B. Microprocessor 41 activates isolation switches 43 and 46 to enter the open or disconnecting state and thereby isolates reconfiguration unit 20 and attachment ports 23 from primary ring input 21 and secondary ring output 22. Microprocessor 41 also activates wrap switch 45 to the closed or connecting state to wrap the primary ring input 21 to the secondary ring output 22. Microprocessor 41 also isolates the ring out 29 of MAC 25 from the primary ring output 26 by activating isolation switch 51 to enter the open or disconnecting state. Reconfiguration unit 20 is isolated from secondary ring input 27 by activation of isolation switch 54 to the open or disconnecting state. Primary ring output 26 is wrapped to secondary ring input 27 by activation of wrap switch 52 to the closed or connecting state. To create an internal ring between the devices attached to reconfiguration unit 20 and MAC 25, microprocessor 41 activates wrap switches 44 and 53 which enter the closed or connecting state and which connect the primary ring input of port reconfiguration means 40 to the internal secondary ring between isolation switches 46 and 50 and which connects the ring out 29 of MAC 25 to the internal secondary ring between isolation switches 50 and 54.

If no errors are detected on the internal ring formed by reconfiguration unit 20 entering the internal isolation wrap state then the "yes" path of block 113 is taken. Because no errors occurred during the internal wrap, the error must have occurred upstream of reconfiguration unit 20. Reconfiguration unit 20 then unwraps the ring out side of the unit and enters the downstream unit wrap state indicated in FIG. 2D. The downstream wrap state is entered by microprocessor 41 deactivating wrap switches 52 and 53 and deactivating isolation switches 51 and 54. Thus, the isolated reconfiguration unit 20 is reconnected to the primary and secondary rings by disconnecting the primary ring output 26 from the secondary ring input 27, connecting the ring out 29 of MAC 25 to the primary ring output 26 and connecting the internal secondary ring at isolation switch 54 to the secondary ring input 27. Reconfiguration unit 20 also loads and starts a Downstream Retest Timer (T3) as reflected in block 115 of FIG. 4B. Times of from about 4 to about 5 minutes are preferred for T3. However, other times may be used based upon a particular network implementation or user preference.

As seen in blocks 118 and 119 of FIG. 4B, upon expiration of T3 reconfiguration unit 20 unwraps the input side of the unit and reenters the normal connection mode. Normal connection is reestablished by deactivating wrap switches 44 and 45 and isolation switches 43 and 46 to disconnect the primary ring from the secondary ring and reconnect the secondary ring internal to the reconfiguration unit to the secondary ring output 22 and the primary ring input of port reconfiguration means 40 to primary ring input 21. If errors continue to occur, reconfiguration unit 20 reenters the downstream wrap state shown in FIG. 2D and described above. Optionally, reconfiguration unit 20 could reinitiate the Downstream Retest Timer and retest the ring after the timer expires or could simply notify the system administrator that the error was not corrected in time T3 and that manual intervention was required to return the reconfiguration unit to normal connection mode.

If errors are detected on the internal ring formed by reconfiguration unit 20 entering the internal isolation wrap state then the "no" path of block 113 is taken. If an error is detected in the internal isolation wrap state then the error was caused by a device attached to reconfiguration unit 20 or is internal to reconfiguration unit 20. Reconfiguration unit 20 then maintains the internal isolation wrap state and performs internal isolation procedures reflected in block 114 to isolate the fault and bypass the fault if possible. In a preferred embodiment the fault detection and isolation procedure are carried out as described in copending and commonly assigned application entitled "DUAL FAULT RING ISOLATION" and having U.S. application Ser. No. 08/386, 384, the disclosure of which is incorporated herein by reference as if set forth fully. However, as will be appreciated by one of ordinary skill in this art, in the present invention the functions of the "S" adapter of the copending application would be carried out by MAC 25. If the internal isolation procedure successfully bypasses the source of the fault then reconfiguration unit 20 may return to normal connection mode as described above.

When any devices attached to reconfiguration unit 30 receive the BNR frame transmitted by MAC 25, these device enter Beacon Repeat mode and repeat the beacon frame on the ring. When MAC 35 receives the beacon frame it first tests to determine if the frame is a RBNN or TBNN frame. Because the frame is a BNR frame, the "no" branch of block 101 is taken and the test of block 106 is performed to see if the frame is a BNR frame. If the frame is a BNR frame then reconfiguration unit 30 enters Beacon Repeat Mode as reflected in block 107. In Beacon Repeat Mode, MAC 35 repeats the BNR frame on the primary ring. Reconfiguration unit 30 then evaluates the source address field of the BNR frame to determine if the reconfiguration unit generating the BNR frame is the nearest downstream reconfiguration unit to reconfiguration unit 30.

Each of the reconfiguration units keeps track of the number of consecutive BNR frames received from the nearest downstream reconfiguration unit in a counter referred to herein as the Beacon Counter. As seen in blocks 108 and 110, the Beacon Counter is initially zero and is incremented each time a BNR frame is received with a source address of the nearest downstream reconfiguration unit to the unit receiving the BNR frame. If an intervening BNR frame with a different source address is received then the Beacon Counter is reset to zero. To allow the beacon condition to settle to the correct fault domain, as reflected in block 111, no fault isolation or recovery action other than repeating the BNR frame is carried out until 8 consecutive BNR frames are received with the source address of the nearest downstream reconfiguration unit to the unit receiving the BNR frame. While the present example has set 8 as the value for the Beacon Counter, as will be appreciated by one of skill in this art, other values may be used.

Because reconfiguration unit 20 is not the nearest downstream reconfiguration unit to reconfiguration unit 30 the "no" path of block 108 is taken and reconfiguration unit 30 resets its Beacon Counter to zero as reflected in block 109. No further action is taken by reconfiguration unit 30.

As with the devices attached to reconfiguration unit 30, when the devices attached to reconfiguration unit 10 receive the BNR frame the devices repeat the frame on the primary ring. When reconfiguration unit 10 receives the BNR frame it carries out the testing described above. Because reconfiguration unit 20 which generated the BNR frame is the nearest downstream reconfiguration unit to reconfiguration unit 10, reconfiguration unit 10 will eventually receive 8 consecutive BNR frames with the source address of reconfiguration unit 20 and the "yes" branch of block ill will be carried out by reconfiguration unit 10.

After receiving the 8 consecutive BNR frames reconfiguration unit 10 carries out the procedure of block 120 and enters the MAC isolation state depicted in FIG. 2A. The MAC isolation state is entered by the microprocessor 41 of reconfiguration unit 10 activating isolation switches 47, 51, 54 and 50 of reconfiguration unit 10 to enter the open or disconnecting state and activating wrap switches 48, 49, 52, and 53 of reconfiguration unit 10 to enter the closed or connecting state. The activation of the above wrap and isolation switches wraps the primary output of the port reconfiguration means 40 of reconfiguration unit 10 to the secondary ring internal to the reconfiguration unit. A ring is also formed from the ring in 28 to the ring out 29 of MAC 15 of reconfiguration unit 10. Finally, the primary output 16 is wrapped to the secondary input 17 of reconfiguration unit 10.

If an error is detected by the wrapped MAC 15 of reconfiguration unit 10 then reconfiguration unit 10 takes the "no" path of block 121 and carries out the internal error procedures reflected by block 127. With the output of MAC 15 wrapped to the input of MAC 15, microprocessor 41 checks the status information of MAC 15 of reconfiguration unit 10. If an error is detected in the status information, reconfiguration unit 10 enters the internal isolation state and reports the error to the user.

If no errors are detected by the wrapped MAC 15 of reconfiguration unit 10 then reconfiguration unit 10 takes the "yes" path of block 121 and enters the upstream wrap state shown in FIG. 2C. Reconfiguration unit 10 also starts art Upstream Retest Timer (T2) reflected by block 122. Values of T2 from about 4 to about 5 minutes are preferred; however, as will be appreciated by one of skill in this art, other values may be used. Upstream wrap state is entered by deactivating isolation switches 47, and 50 of reconfiguration unit 10 and deactivation of wrap switches 48 and 49 of reconfiguration unit 10. Therefore, entering the upstream wrap state connects the primary ring output 16 to the secondary ring input 17 while maintaining the isolation of the ring out 29 of MAC 15 from the primary ring output 26 and maintains the isolation of the internal secondary ring of reconfiguration unit 10. Entering the upstream wrap state also results in a wrap from the ring out 29 of MAC 15 to the internal secondary ring of reconfiguration unit 10.

As seen in blocks 123 and 124 of FIG. 4C upon expiration of T2 reconfiguration unit 10 unwraps the output side of the unit and reenters the normal connection mode. Normal connection is reestablished by deactivating wrap switches 52 and 53 and isolation switches 51 and 54 to disconnect the primary ring from the secondary ring and reconnect the internal secondary ring of reconfiguration unit 10 to the secondary ring input 17 and the primary ring input of port reconfiguration means 40 of reconfiguration unit 10 to primary ring output 16. If errors continue to occur, reconfiguration unit 10 reenters the upstream wrap state shown in FIG. 2C and described above. Optionally, reconfiguration unit could reinitiate the Upstream Retest Timer (T2) and retest the ring after the timer expires or could simply notify the system administrator that the error was not corrected in time T2 and that manual intervention was required to return the reconfiguration unit to normal connection mode.

As discussed above, to fully implement the error recovery and bypass of a single MAC reconfiguration unit each of the single MAC reconfiguration units in the ring should know if a failure frame is generated by the nearest downstream reconfiguration unit to the reconfiguration unit receiving the failure frame. Furthermore, any method for determining the nearest downstream reconfiguration unit is preferably compatible with existing reconfiguration units so as to maintain fault isolation and bypass capabilities when single MAC reconfiguration units are incorporated in networks having other types of reconfiguration units. The method described below provides such capabilities.

To determine the address of the nearest downstream reconfiguration unit in a ring network such as that shown in FIG. 1, the reconfiguration units first arbitrate to determine which reconfiguration unit will assume the Reconfiguration Unit Monitor function on the ring. One method of determining which station will become the Reconfiguration Unit Monitor would be for the first active reconfiguration unit on the ring capable of carrying out the monitor functions to become the Reconfiguration Unit Monitor. To determine the first active reconfiguration unit capable of carrying out the monitor functions the reconfiguration units wait to see if a predefined frame is received on the ring within a predetermined time (TM). This time may be either from power on of the reconfiguration unit or may be from the last receipt of the predefined frame. If the predefined frame is received within the TM time, then another of the reconfiguration units has assumed the role of Reconfiguration Unit Monitor. If the predefined frame is not received within the TM time then the reconfiguration unit for which the TM timer has expired generates the predefined frame on the ring and becomes the active Monitor. Because the reconfiguration units are typically powered on at different times, the TM timers would expire at different times and thus avoid contention. Also, because the reconfiguration units receive the predefined frames sequentially, these frames are received at different times for each reconfiguration unit. Accordingly, the TM timers in the reconfiguration units will be restarted at different times and contention will again be avoided. Thus, it is preferred that the value of TM be set to the same value for each of the reconfiguration units capable of assuming the status of Reconfiguration Unit Monitor.

Once a Reconfiguration Unit Monitor is established, the reconfiguration units which are not performing the Monitor function wait for receipt of a Reconfiguration Unit Map from the Reconfiguration Unit Monitor. The Reconfiguration Unit Map contains the address of each of the reconfiguration units in sequential order around the ring. When the Reconfiguration Unit Map is received by the reconfiguration units, the reconfiguration units extract from the map the address of the nearest downstream reconfiguration unit by locating their own address in the ring map and extracting the next address in the map.

To construct the ring map, the Reconfiguration Unit Monitor generates a frame on the ring which requests the address of each reconfiguration unit. The Reconfiguration Unit Monitor then stores the addresses received from the other reconfiguration units on the ring and, when all the other addresses are stored adds its own address to the table of reconfiguration unit addresses. The Reconfiguration Unit Monitor also obtains the address of each attachment to the ring in ring sequence order from the neighbor notification process which occurs on the ring. The Reconfiguration Unit Monitor then assembles the ring sequence map of reconfiguration units by placing the reconfiguration units in the sequence indicated from the neighbor notification process performed on the ring. The Reconfiguration Unit Monitor then compares this new Reconfiguration Unit Map to the previous Reconfiguration Unit Map if one existed and, if none existed or if changes are detected, transmits the Reconfiguration Unit Map to the other reconfiguration units on the ring. The Reconfiguration Unit Monitor may periodically repeat the above procedure to accommodate any changes to the ring and provide accurate, timely, information to the remaining reconfiguration units.

A particular implementation of the above method on an IEEE 802.5 Token Ring network will now be described with reference to FIG. 1, FIG. 5A and FIG. 5B.

Figure 5A:
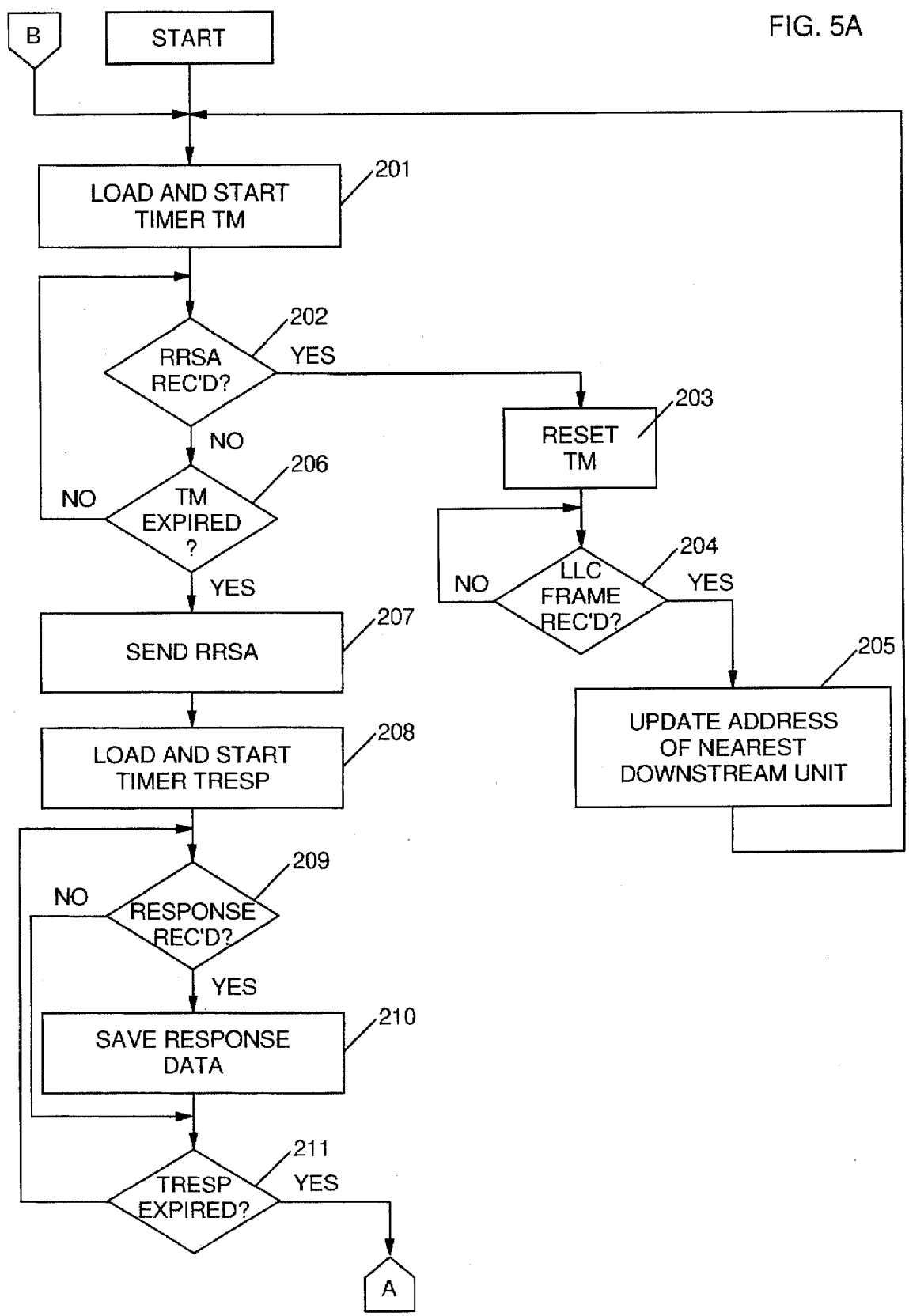
FIG. 5A and FIG. 5B is a flow chart of one embodiment of the operations performed by a reconfiguration unit as a method of determining the address of the nearest downstream reconfiguration unit.
Figure 5B:
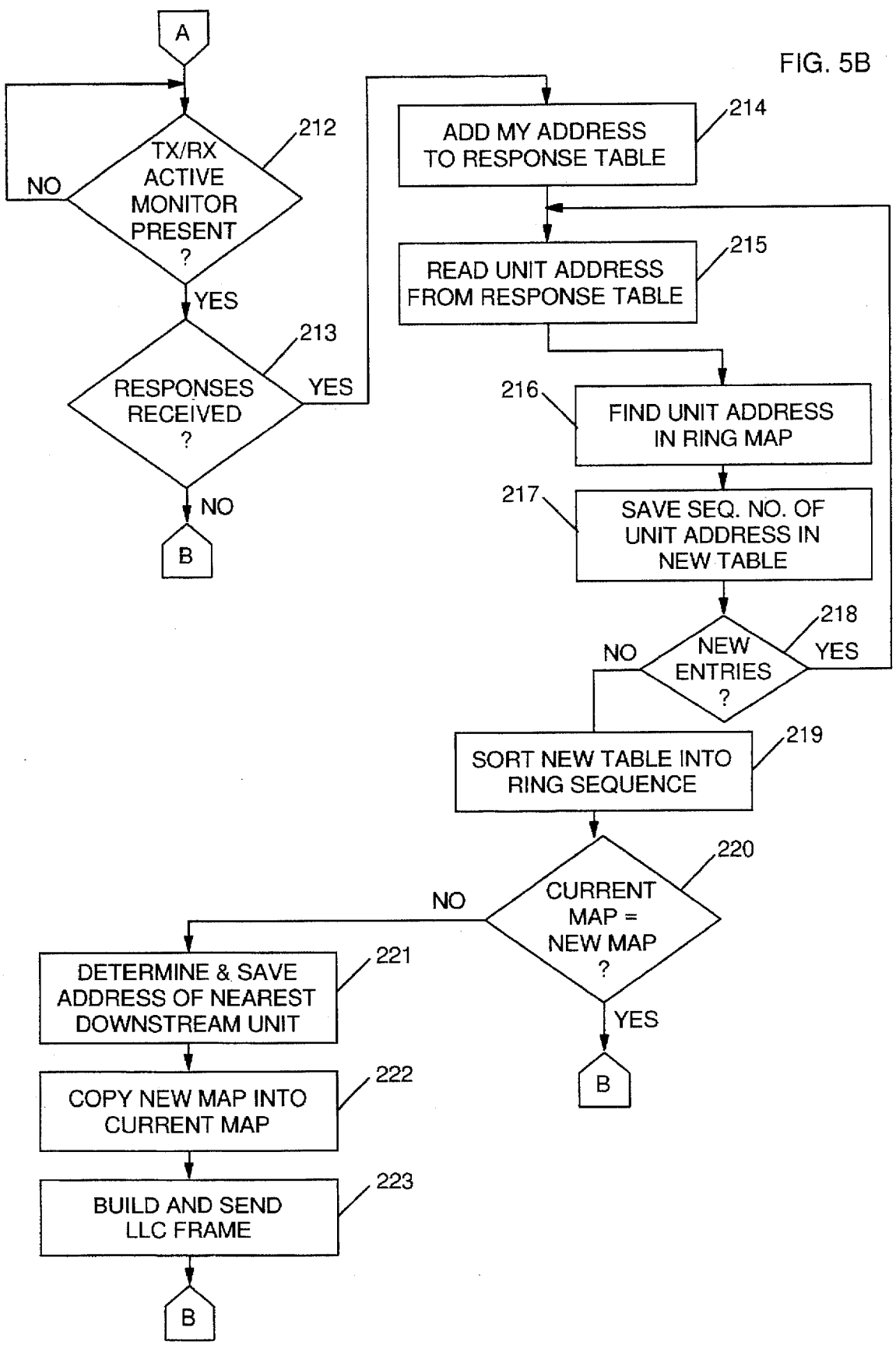

When any of reconfiguration units 10, 20 or 30 is powered on it executes block 201 of FIG. 5A and loads and starts the timer with the TM predetermined time value. Each of the reconfiguration units then wait for the duration of its TM timer to receive a Request Ring Station Attachment frame (RRSA) from the ring as reflected in blocks 202 and 206. TM values of from about 14 to about 17 seconds are preferred; however, as will be appreciated by one of skill in this art, other values may be used. Receipt of a RRSA frame indicates an active Reconfiguration Unit Monitor. Because each of the reconfiguration units was first powered on none of the units would receive the RRSA frame within the time TM. The reconfiguration units would remain in the 202/206 loop until one of the reconfiguration units TM timer expired and the "yes" branch of the 206 decision block is taken.

For purposes of illustration, it is assumed that reconfiguration unit 20 is the first reconfiguration unit to have its TM timer expire. Thus, reconfiguration unit 20 assumes the function of Reconfiguration Unit Monitor. Reconfiguration unit 20 then executes block 207 and generates a RRSA frame on the ring. Reconfiguration unit 20 then loads and starts its Response Timer (TRESP) as reflected in block. 208. Reconfiguration unit 20 then waits for the other reconfiguration units to respond with their station addresses. As seen in blocks 209, 210, and 211, reconfiguration unit 20 waits the time TRESP for responses from the RRSA frame and if received saves the address information from the response frame. TRESP values of about 7 seconds are preferred; however, as will be appreciated by one of ordinary skill in this art, other values may be used. The address information received in response to the RRSA frame may be stored by reconfiguration unit 20 in a Response Table. In the present example, reconfiguration unit 20 would receive and store address information from reconfiguration unit 30 and reconfiguration unit 10, however, the address information stored in the Response Table would not necessarily be in ring sequence.

After the Response Timer expires the "yes" branch of decision block 211 is taken and, as reflected in decision block 212, reconfiguration unit 20 waits for notification on the ring that an attachment has become the Active Monitor. This may be accomplished by receipt of the Active Monitor Present frame on the ring.

After receipt of the Active Monitor Present Frame, reconfiguration unit 20 checks to see if there were any responses to the RRSA frame. If there were no responses then there are no other active reconfiguration units in the ring and the "no" branch of block 213 is taken. Reconfiguration unit 20 then returns to the Reconfiguration Unit Monitor arbitration process described above. This process periodically repeats to determine if another reconfiguration unit was placed in the ring.

If at least one response to the RRSA frame was received, then reconfiguration unit 20 takes the "yes" branch from block 213. In the present example, reconfiguration unit 20 would take the "yes" branch and add its own address to the Response Table as indicated in block 214.

To place the address information in the Response Table in ring sequence order, reconfiguration unit 20 makes use of a ring map which contains the address of each active device attached to the ring, including reconfiguration units, in ring sequence order. This ring map may be generated during a neighbor notification process which is initiated by the Active Monitor on the ring. By monitoring the Neighbor Notification process reconfiguration unit 20 can construct the ring map of addresses in ring sequence order. While the ring map contains address information in ring sequence order it does not identify the type of device at each address. Therefore, reconfiguration unit 20 carries out the steps reflected in blocks 215, 216, 217, and 218 to identify the location of addresses of reconfiguration units in the ring map.

In building a Reconfiguration Unit Map, reconfiguration unit 20 first extracts an address from the Response Table (215) and finds that address in the ring map (216). The sequence number of the extracted address is then saved in a Reconfiguration Unit Map (217). These steps are repeated until the sequence numbers of all of the reconfiguration unit addresses have been placed in the Reconfiguration Unit Map and the "no" branch of block 218 is taken. As reflected in block 219 the sequence numbers in the Reconfiguration Unit Map are then sorted into ring sequence. Reconfiguration unit 20 then compares this newly generated Reconfiguration Unit Map to the previous Reconfiguration Unit Map stored by Reconfiguration Unit 20, if one exists, and if there are no changes takes the "yes" branch of block 220 and starts the Reconfiguration Unit Monitor process again.

If there are changes in the Reconfiguration Unit Map or no previous Reconfiguration Unit Map existed, then reconfiguration unit 20 takes the "no" branch of block 220 and extracts and stores the nearest downstream reconfiguration unit address from the Reconfiguration Unit Map as reflected in block 221. In the present example, reconfiguration unit 20 would extract and store the address of reconfiguration unit 30. Reconfiguration unit 20 then overwrites the stored Reconfiguration Unit Map with the new Reconfiguration Unit Map (222) and builds a Logical Link Control (LLC) frame where the data field of the LLC frame contains the new Reconfiguration Unit Map (223). This LLC frame is then generated on the ring and reconfiguration unit 20 starts the Reconfiguration Unit Monitor process again.

For the reconfiguration units which do not become the Reconfiguration Unit Monitor, such as reconfiguration units 30 and 10 in the present example, an RRSA frame is received from the Reconfiguration Unit Monitor before expiration of the TM timer. Therefore, the "yes" branch of decision block 202 is taken. Upon receipt of the RRSA frame, reconfiguration units 10 and 30 respond with the Report Ring Station Attachment frame which contains the source address of the unit generating the frame and information about the product in which the ring station resides. Thus, from the Report Ring Station Attachment frame the Reconfiguration Unit Monitor can determine the address of each of the other reconfiguration units on the ring. Also upon receipt of the RRSA frame, reconfiguration units 10 and 30 reset the TM timer as seen in block 203. After responding to the RRSA frame, reconfiguration units 10 and 30 then wait for the LLC frame containing the Reconfiguration Unit Map (204). Once the LLC frame is received, each reconfiguration unit extracts the address of the nearest downstream reconfiguration unit from the Reconfiguration Unit Map (205). Reconfiguration units 10 and 30 then begin the Reconfiguration Unit Monitor process again, waiting for another RRSA frame.

In the drawings and specification, there have been disclosed typical preferred embodiments of the invention and, although specific terms are employed, these terms are used in a generic and descriptive sense only and not for purposes of limitation, the scope of the invention being set forth in the following claims.

That which is claimed:

1. A method for reconfiguring a dual ring communication system to isolate and bypass failed components or connections in which the dual ring communication system has a primary ring (PR) for carrying signals in a first direction and a secondary ring (SR) for carrying signals in a second direction opposite to said first direction wherein the PR and the SR are interconnected by a plurality of reconfiguration units, each of said reconfiguration units having a PR input, a PR output, a SR input and a SR output, a plurality of attachment ports suitable for receiving signals from data terminals or the like, at least one medium access controller (MAC) for receiving, generating and/or repeating signals on the PR and switching units for selectively wrapping the PR and SR, the reconfiguration method comprising the steps of:

detecting a failure on the PR;

generating a failure frame on the PR wherein the failure frame contains the address of the first MAC which detected the failure and generated the failure frame;

determining if the failure frame is received from the PR; and connecting a first attachment port to the SR input while isolating the SR input from the SR output, isolating the PR input from the first attachment port and connecting the PR input to the SR output if the MAC generation the failure frame has not received the failure frame from the PR within a preselected time to thereby bypass the failure.

2. The method of claim 1 wherein the reconfiguration unit detecting the failure has switching units for selectively isolating the ring of the reconfiguration unit and wherein said connecting step further comprises the steps of:

isolating the reconfiguration unit associated with the MAC generating the failure frame from the PR and SR of the dual ring communication network if the MAC generating the failure frame has not received the failure frame from the PR within a preselected time wherein the reconfiguration unit is isolated by isolating the attachment ports and the MAC from the PR input, the PR output, the SR input and the SR output while maintaining an internal ring between the ports of the reconfiguration unit and the MAC of the reconfiguration unit while connecting the PR input to the SR output and the PR output to the SR input;

testing the isolated reconfiguration unit to determine if the failure was caused by the isolated reconfiguration unit;

reconnecting the isolated reconfiguration unit to the PR and SR when said testing determines that the isolated reconfiguration unit did not cause the failure by disconnecting the PR output from the SR input and reconnecting the first attachment port to the SR input and the MAC output to the PR output while maintaining the connection between the PR input and SR output and the isolation from the PR input and SR output.

3. The method of claim 1 further comprising:

wrapping the PR to the SR at the PR output and SR input of the nearest upstream reconfiguration unit and wrapping the attachment ports to the SR output of the upstream configuration unit.

4. The method of claim 3 wherein the MAC of the upstream reconfiguration unit can repeat signals on the PR and wherein said wrapping step further comprises the steps of:

wrapping the PR to the SR at the PR output and SR input of the upstream reconfiguration unit which receives the failure frame containing a source address of the MAC of the nearest downstream reconfiguration unit to the reconfiguration unit receiving the failure frame while connecting the MAC output to the SR output and isolating the MAC output from the PR output and isolating the SR output from the SR input; and repeating the failure frame on the PR when the source address of the failure frame is not the address of the nearest downstream reconfiguration unit of the MAC receiving the failure frame.

5. The method of claim 4 further comprising the steps of:
- waiting a preselected time after determining the downstream reconfiguration unit did not cause the failure; and then
- reevaluating the PR and SR connection between the upstream reconfiguration unit and the downstream reconfiguration unit by reconnecting the input of the first attachment port of the downstream reconfiguration unit to the PR input, the output of the MAC to the PR output and the SR input to the SR output while disconnecting the SR output from the PR input and monitoring the PR to determine if a failure continues to occur; and
- disconnecting the downstream reconfiguration unit PR and SR from the PR input and SR output of the downstream reconfiguration unit, connecting the PR input to the SR output and connecting PR to SR prior to the first attachment port of the downstream reconfiguration unit if the failure continues to occur.

6. The method of claim 3 wherein the upstream reconfiguration unit has a switching unit for selectively isolating the MAC of the reconfiguration unit from the PR and the SR and wrapping the input of the MAC to the output of the MAC and wherein said method further comprises the steps of:
- isolating from the PR and the SR the MAC of the upstream reconfiguration unit receiving the failure frame when a failure frame is received which has a source address of the MAC of the nearest downstream reconfiguration unit;
- wrapping the PR and the SR of the upstream reconfiguration unit by connecting the PR to the SR after the last port and before the MAC of the upstream reconfiguration unit and connecting the PR output to the SR input of the upstream reconfiguration unit;
- testing the isolated MAC to determine if the MAC is the cause of the failure; then
- reconnecting the isolated MAC if the testing determines that the MAC is not the cause of the failure by reconnecting the MAC to the PR and SR while maintaining the isolation from the PR output and the SR input and relocating the wrap of the PR and SR to after the MAC of the upstream reconfiguration unit.

7. The method of claim 6 further comprising the steps of:
- reevaluating the PR and SR connection between the upstream reconfiguration unit and the downstream reconfiguration unit when the MAC of the upstream reconfiguration unit was determined to not be the cause of the failure and after a preselected time by reconnecting the upstream reconfiguration unit PR input to the PR output and the SR output to the SR input and monitoring the PR to determine if a failure continues to occur; and
- disconnecting the upstream reconfiguration unit PR and SR from the PR output and SR input of the upstream reconfiguration unit, connecting the PR output to the SR input and connecting PR to SR of the upstream reconfiguration unit if the failure continues to occur.

8. The method of claim 1 wherein said detecting step comprises detecting an IEEE 802.5 Type 2, Type 3 or Type 4 beacon frame or detecting an absence of transmissions on the PR.

9. The method of claim 8 wherein said generating step comprises generating an IEEE 802.5 Type 1 beacon frame on the PR containing the address of the MAC generating the frame as the source address field of the beacon frame.

10. A method for reconfiguring a concentrator for a dual ring communication system to isolate and bypass failed components or connections in which the dual ring communication system has a primary ring (PR) carrying signals in a first direction and a secondary ring (SR) for carrying signals in a second direction opposite to said first direction and wherein the concentrator has a PR input, a PR output, a SR input and a SR output, a plurality of attachment ports suitable for receiving signals from data terminals or the like, at least one medium access controller (MAC) for receiving, generating and/or repeating signals on the PR and switching units for selectively wrapping the PR and SR, the steps comprising:
- detecting a failure on the PR;
- generating a failure frame on the PR wherein the failure frame contains the address of the MAC of the concentrator;
- determining if the failure frame is received on the PR with the address of the MAC of the concentrator;
- bypassing the failure when the MAC generating the failure frame has not received the failure frame from the PR within a preselected time by connecting a first attachment port to the SR input of the concentrator while isolating the SR output from the SR input and the PR input from the first attachment port and connecting the SR output to the PR input.

11. The method of claim 10 wherein the concentrator has switching units for selectively isolating the ring of the concentrator and wherein said bypassing step further comprises the steps of:
- isolating the concentrator generating the failure frame from the PR and SR of the dual ring communication network if the MAC generating the failure frame has not received the failure frame from the PR within a preselected time wherein the concentrator is isolated by isolating the attachment ports and the MAC from the PR input and output and the SR input and output while maintaining an internal ring between the ports of the concentrator and the MAC of the concentrator while connecting the PR input to the SR output and the PR output to the SR input;
- testing the isolated concentrator to determine if the failure was caused by the isolated concentrator;
- reconnecting the isolated concentrator to the PR and SR when said testing determines that the isolated concentrator did not cause the failure by disconnecting the PR output from the SR input and reconnecting the first attachment port to the SR input and the MAC output to the PR output while maintaining the connection between the PR input and SR output and the isolation from the PR input and SR output.

12. The method of claim 11 further comprising the steps of:
- waiting a preselected time after determining the concentrator did not cause the failure; and then
- reevaluating the PR and SR by reconnecting the input of the first attachment port of the concentrator to the PR input, the output of the MAC to the PR output and the SR input to the SR output while disconnecting the SR output from the PR input and monitoring the PR to determine if a failure continues to occur; and
- disconnecting the concentrator PR and SR from the PR input and SR output of the concentrator, connecting the PR input to the SR output and connecting PR to SR prior to the first attachment port of the concentrator if the failure continues to occur.

13. The method of claim 10 wherein said detecting step comprises detecting an IEEE 802.5 Type 2, Type 3 or Type 4 beacon frame or detecting an absence of transmissions on the PR.

14. The method of claim 13 wherein said generating step comprises generating an IEEE 802.5 Type 1 beacon frame on the PR containing the address of the MAC generating the frame as the source address field of the beacon frame.

15. A method for reconfiguring a concentrator for a dual ring communication system to isolate and bypass failed components or connections in which the dual ring communication system has a primary ring (PR) carrying signals in a first direction and a secondary ring (SR) for carrying signals in a second direction opposite to said first direction and wherein the concentrator has a PR input, a PR output, a SR input and a SR output, a plurality of attachment ports suitable for receiving signals from data terminals or the like, at least one medium access controller (MAC) for receiving generating and/or repeating signals on the PR and switching units for selectively wrapping the PR and SR, the steps comprising:

receiving a failure frame from the PR;

wrapping the PR to the SR at the PR output and SR input when the failure frame contains a source address corresponding to the MAC of the nearest downstream concentrator while connecting the MAC output to the SR output and isolating the MAC output from the PR output and isolating the SR output from the SR input; and repeating the failure frame on the PR when the source address of the failure frame is not the address corresponding to the MAC of the nearest downstream concentrator.

16. The method of claim 15 wherein the concentrator has a switching unit for selectively isolating the MAC of the concentrator from the PR and the SR and wrapping the input of the MAC to the output of the MAC and wherein said method further comprises the steps of:

isolating from the PR and the SR the MAC of the concentrator when a failure frame is received which has a source address of the MAC of the nearest downstream concentrator;

wrapping the PR and the SR of the concentrator by connecting the PR to the SR after the last attachment port and before the MAC of the concentrator and connecting the PR output to the SR input;

testing the isolated MAC to determine if the MAC is the cause of the failure; then reconnecting the isolated MAC if the testing determines that the MAC is not the cause of the failure by reconnecting the MAC to the PR and SR while maintaining the isolation from the PR output and the SR input and relocating the wrap of the PR and SR to after the MAC of the concentrator.

17. The method of claim 16 further comprising the steps of:

reevaluating the PR and SR connection after a preselected time if the MAC of the concentrator was determined to not be the cause of the failure by reconnecting the concentrator PR input to the PR output and the SR output to the input and monitoring the PR to determine if a failure continues to occur; and disconnecting the concentrator PR and SR from the PR output and SR input of the concentrator, connecting the PR output to the SR input and connecting PR to SR subsequent to the MAC of the concentrator if the failure continues to occur.

18. The method of claim 15 wherein said failure frame is an IEEE 802.5 Type 1 beacon frame.

19. The method of claim 15 wherein the MAC of the concentrator can generate signals on the PR, said method further comprising the steps of:

detecting if the failure has occurred on the PR;

generating the failure frame on the PR when said detecting step detects a failure and wherein the failure frame contains the address of the MAC of the concentrator;

determining if the failure frame is received on the PR with the address of the MAC of the concentrator;

bypassing the failure when the MAC generating the failure frame has not received the failure frame from the PR within a preselected time by connecting a first attachment port to the SR input of the concentrator while isolating the SR output from the SR input and the PR input from the first attachment port and connecting the SR output to the PR input.

20. A reconfiguration unit for a dual ring communication system comprising:

a primary ring input;

a primary ring output;

a secondary ring input;

a secondary ring output;

a plurality of attachment ports having a ring in connection and a ring out connection suitable for receiving signals from data terminals and the like;

a medium access control unit (MAC) having a ring in connection and a ring out connection wherein said MAC is connected downstream of a last active attachment port for receiving, generating and/or repeating signals;

port reconfiguration means connected to said primary ring input, said primary ring output, said MAC and said plurality of attachment ports for selectively connecting primary ring input, primary ring output, said MAC and said attachment ports to form a ring path between active attachment ports and said MAC in response to control signals;

control means connected to said MAC and said port reconfiguration means for providing said control signals to said port reconfiguration means and for receiving and transmitting signals to said MAC; and downstream wrap means responsive to said control means for selectively disconnecting said SR input from said SR output, disconnecting said PR input from said ring in connection of a first active attachment port and for connecting said ring in connection of said first active attachment port to said SR input and connecting said PR input to said SR output.

21. The reconfiguration unit of claim 20 further comprising:

internal ring connection means responsive to said control means for selectively connecting the ring in and ring out connections of the active attachment ports to the ring in and ring out connections of said MAC to form a ring of said active attachment ports and said MAC internal to said reconfiguration unit.

22. The reconfiguration unit of claim 20 further comprising:

MAC isolation means responsive to said control means for selectively isolating said MAC from said attachment ports and said input and output ports and for connecting said ring in connection to said ring out connection of said MAC while connecting a PR output port to a SR input port and connecting the ring out connection of the last active attachment port to said SR output port.

23. The reconfiguration unit of claim 21 further comprising:

reconfiguration unit isolation means responsive to said control means for selectively activating said internal ring connection means and for connecting said PR output to said SR input and said PR input to said SR output.

24. The reconfiguration unit of claim 20 further comprising:

upstream wrap means responsive to said control means for connecting said PR output to said SR input and connecting said ring out connection of said MAC to said SR output.

25. A dual ring communication system capable of fault isolation and fault bypass comprising:

at least two reconfiguration units connected so as to form a ring wherein at least one of said reconfiguration units is a single medium access controller (MAC) reconfiguration unit, and where said single (MAC) reconfiguration unit comprising:

a primary ring input;

a primary ring output;

a secondary ring input;

a secondary ring output;

a plurality of attachment ports having a ring in connection and a ring out connection suitable for receiving signals from data terminals and the like;

a medium access control unit MAC having a ring in connection and a ring out connection wherein said MAC is connected downstream of a last active attachment port for receiving, generating and/or repeating signals;

port reconfiguration means connected to said primary ring input, said primary ring output, said MAC and said plurality of attachment ports for selectively connecting input ports, output ports, said MAC and said attachment ports to form a dual ring communication system between active attachment ports, said MAC and said inputs and outputs in response to control signals;

control means connected to said MAC and said port reconfiguration means for providing said control signals to said port reconfiguration means and for receiving and transmitting signals to said MAC; and downstream wrap means responsive to said control means for selectively disconnecting a SR input from a SR output, disconnecting said PR input from said ring in connection of a first active attachment port and for connecting said ring in connection of said first active attachment port to said SR input and connecting said PR input to said SR output.

26. The dual ring communication system of claim 25 wherein each of said reconfiguration units is a single MAC reconfiguration unit.

* * * * *

UNITED STATES PATENT AND TRADEMARK OFFICE
CERTIFICATE OF CORRECTION

PATENT NO. : 5,663,950
DATED : September 2, 1997
INVENTOR(S) : Nai Po Lee; Jay Lee Smith It is certified that error appears in the above-identified patent and that said Letters Patent is hereby corrected as shown below:

Column 20, Line 16: "generation" to -- generating --.

Signed and Sealed this

Sixth Day of January, 1998

Attest:

BRUCE LEHMAN

*Attesting Officer*   *Commissioner of Patents and Trademarks*